(12) United States Patent
Kawaguchi

(10) Patent No.: US 9,214,010 B2
(45) Date of Patent: Dec. 15, 2015

(54) IMAGE PROCESSING APPARATUS, IMAGE PROCESSING METHOD, AND PROGRAM PRODUCT

(71) Applicant: Renesas Electronics Corporation, Kawasaki-shi, Kanagawa (JP)

(72) Inventor: Hirofumi Kawaguchi, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 475 days.

(21) Appl. No.: 13/665,658

(22) Filed: Oct. 31, 2012

(65) Prior Publication Data

US 2013/0120431 A1 May 16, 2013

(30) Foreign Application Priority Data

Nov. 16, 2011 (JP) ................................. 2011-250926

(51) Int. Cl.
| | |
|---|---|
| G09G 5/02 | (2006.01) |
| G09G 3/20 | (2006.01) |
| G06T 3/00 | (2006.01) |
| G06T 5/00 | (2006.01) |
| G06T 7/40 | (2006.01) |
| H04N 1/40 | (2006.01) |
| H04N 1/60 | (2006.01) |
| H04N 9/64 | (2006.01) |
| G06T 1/00 | (2006.01) |

(Continued)

(52) U.S. Cl.
CPC . *G06T 5/00* (2013.01); *G06T 7/408* (2013.01); *H04N 1/62* (2013.01); *H04N 1/628* (2013.01); *H04N 9/64* (2013.01); *H04N 9/643* (2013.01); *G06T 2207/10024* (2013.01)

(58) Field of Classification Search
CPC combination set(s) only.
See application file for complete search history.

(56) References Cited

U.S. PATENT DOCUMENTS 5,416,890 A * 5/1995 Beretta .......................... 345/590
7,333,237 B2   2/2008 Ogatsu et al.
(Continued)

FOREIGN PATENT DOCUMENTS

| JP | 2002-223366 A | 8/2002 |
|---|---|---|
| JP | 2004-112694 A | 4/2004 |

(Continued)

OTHER PUBLICATIONS

Japanese Office Action dated May 19, 2015 with an English translation thereof.

*Primary Examiner* — Wesner Sajous
(74) *Attorney, Agent, or Firm* — McGinn IP Law Group, PLLC

(57) ABSTRACT

A transformation rule of color transformation in an appropriate color space is set even without advanced knowledge and know-how. A three-dimensional lookup table unit transforms color information on an input image signal on the basis of a transformation rule. A correction range calculation unit calculates a correction range in a predetermined color space on the basis of a positional relationship between source coordinates and destination coordinates in the color space. A lattice point transfer distance calculation unit calculates the transformation destination coordinates at respective points on the basis of the positional relationship between the source coordinates and the destination coordinates, and a positional relationship between coordinates at the respective points within the correction range and the source coordinates to reflect the calculated transformation destination coordinates on the transformation rule.

23 Claims, 25 Drawing Sheets

(51) Int. Cl.
*H04N 1/46* (2006.01)
*H04N 1/62* (2006.01)

(56) References Cited

U.S. PATENT DOCUMENTS

| | | | |
|---|---|---|---|
| 7,366,350 B2 | 4/2008 | Kajihara | |
| 7,379,204 B2 | 5/2008 | Fukao | |
| 7,583,403 B2 | 9/2009 | Ito et al. | |
| 2003/0020974 A1* | 1/2003 | Matsushima | 358/521 |
| 2004/0057614 A1* | 3/2004 | Ogatsu et al. | 382/162 |
| 2005/0213128 A1* | 9/2005 | Imai et al. | 358/1.9 |
| 2007/0230777 A1* | 10/2007 | Tamagawa | 382/162 |
| 2009/0310157 A1* | 12/2009 | Wada | 358/1.9 |
| 2010/0123942 A1* | 5/2010 | Fowler | 358/518 |

FOREIGN PATENT DOCUMENTS

| | | |
|---|---|---|
| JP | 2004-192614 A | 7/2004 |
| JP | 2008-182633 A | 8/2008 |
| JP | 2009-214414 A | 9/2009 |
| JP | 2010-118881 A | 5/2010 |
| WO | WO2004/032524 A1 | 4/2004 |

* cited by examiner

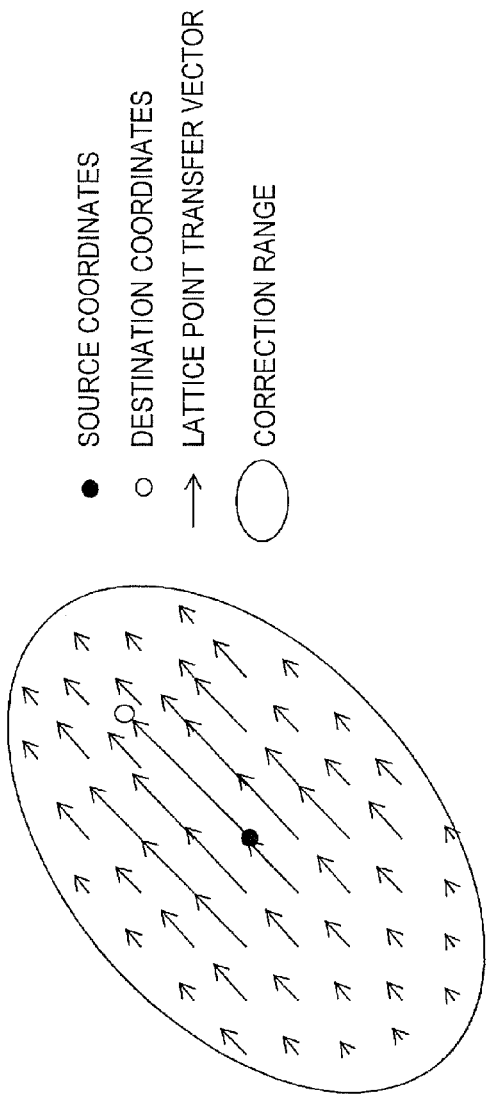
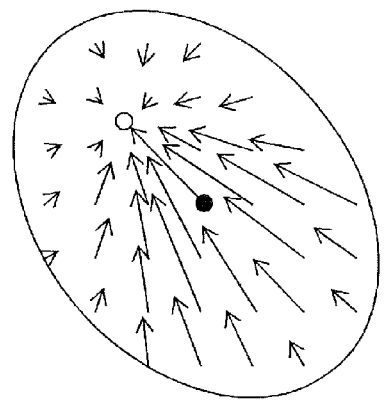

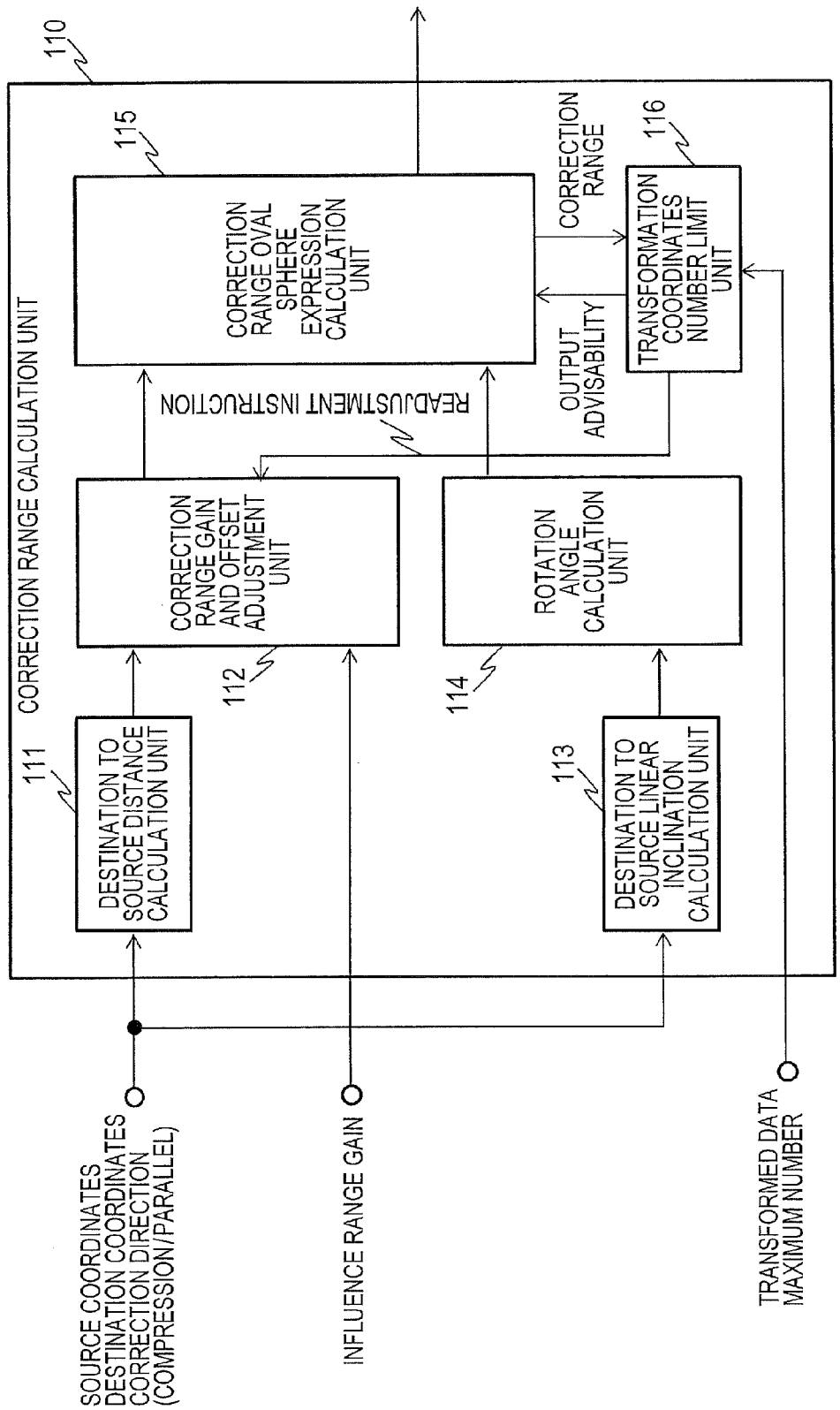

● SOURCE COORDINATES
○ DESTINATION COORDINATES
△ IDEAL DESTINATION COORDINATES
(⌒) ORIGINAL CORRECTION RANGE
◯ ADJUSTED CORRECTION RANGE

IMAGE PROCESSING APPARATUS, IMAGE PROCESSING METHOD, AND PROGRAM PRODUCT

CROSS-REFERENCE TO RELATED APPLICATIONS

The disclosure of Japanese Patent Application No. 2011-250926 filed on Nov. 16, 2011 including the specification, drawings and abstract is incorporated herein by reference in its entirety.

BACKGROUND

The present invention relates to an image processing apparatus, an image processing method, and a program product.

An object or a background has a specific color such as blue of blue sky or pink of cherry blossoms, with which a person images the object or the background. Those colors are called "memory colors". Even if the person looks at an image that faithfully reproduces the color of a certain object or background in keeping with a real world, the person does not evaluate the image as being beautiful. This is because the color (memory color) imaged by the person is different from the reproduced color, and the person recognizes that the color is light, or the like.

For that reason, most of the image processing apparatuses conduct correction processing for reproducing the color imaged by the person for each of the objects and the backgrounds. The correction processing is called "memory color correction". In general, the methods of implementing the memory color correction include the following two methods. That is, there are (1) a dedicated circuit (characteristic correction function) and (2) a three-dimensional lookup table.

First, (1) the memory color correction using the dedicated circuit will be described. In this example, the dedicated circuit conducts processing for specializing in the memory color correction. More specifically, a specific color to be corrected is set for the dedicated circuit in a coordinate format of a source and a destination in a color space such as Cb/Cr or a*/b*. The dedicated circuit corrects a color region including a surrounding color region according to the setting. However, since the dedicated circuit specializes in the memory color correction, the dedicated circuit cannot conduct another processing. Further, in the case of correcting the characteristics of two or more regions, a plurality of dedicated circuits are required.

Subsequently, (2) the memory color correction using a three-dimensional lookup table will be described. Information of the three-dimensional lookup table is stored in an arbitrary memory. In the three-dimensional lookup table is stored table data corresponding to coordinate points such as 9×9×9 or 17×17×17 mainly expressing three-dimensional color spaces of RGB. The three-dimensional lookup table stores correspondence of coordinates of the respective points and coordinates of the transformation destination of the coordinates. For example, if the three-dimensional lookup table has the table data corresponding to the coordinate points of 17×17×17, RGB coordinates (0, 0, 0) and RGB coordinates of its transformation destination, and RGB coordinates (16, 16, 16) and RGB coordinates of its transformation destination are stored in the three-dimensional lookup table. Then, an arbitrary processing unit refers to the three-dimensional lookup table, and transfers the respective coordinates existing in the color space to the coordinates of the transformation destination through a variety of interpolation processing. For example, the processing unit calculates the transformation destination coordinates of the RGB coordinates (8, 8, 8) with reference to the transformation destination coordinates of the RGB coordinates (0, 0, 0) and the transformation destination coordinates of the RGB coordinates (16, 16, 16).

The three-dimensional lookup table merely holds a transformation rule, and the three-dimensional lookup table per se is not provided with any function. However, appropriate table data is set for the three-dimensional lookup table, and processing is conducted according to the transformation rule within the table, thereby making it possible to realize a variety of color management functions such as color gamut mapping, 6-axis correction, memory color correction, or gamma correction. In this example, the table data set in the three-dimensional lookup table can be appropriately changed. For that reason, with only the provision of a single processing circuit (or a processing function using software), a necessary function (including the simultaneous realization of a plurality of region processes and a plurality of other functions) can be realized as the situation demands.

Thus, the correction using the three-dimensional lookup table has the degree of freedom absolutely higher than that of the correction using the dedicated circuit function (characteristic correction function). For that reason, with the configuration using the three-dimensional lookup table, a large number of advantages from the viewpoint of the costs, such as a reduction in development resource and a reduction in circuit scale, and an improvement in usability can be conducted. Furthermore, when a trouble occurs, or when the performance is improved, the table data in the three-dimensional lookup table is replaced with another, as a result of which the problem can be solved without changing the hardware.

Hereinafter, a description will be given of publications disclosing an image processing technology related to the above items. Japanese Unexamined Patent Publication No. 2010-118881 discloses a color signal processing system that conducts color management processing on an input moving image with the use of the three-dimensional lookup table. The system includes a color transformation unit that transforms color information on an input image signal by a multidimensional lookup table, an interpolation unit that outputs a composite image signal in which the image signal transformed by the color transformation unit is combined with the input image signal at an arbitrary ratio, and a lookup table rewrite unit that changes data of the multidimensional lookup table in the color transformation unit. With the above configuration, the system can realize the color management processing with high precision even when rewriting data in the lookup table.

International Publication No. WO2004/032524 discloses an image processing apparatus that conducts automatic color adjustment with few adverse effects to the memory color correction. The image processing apparatus includes an intensity determination unit that generates a correction intensity which in a periphery of a color region is smaller than that in the color region of a specific range set on the basis of two chromaticity components (a*/b*), and a unit that conducts correction according to the generated correction intensity.

SUMMARY

However, the correction processing in the color space in conformity with the transformation rule such as the three-dimensional lookup table suffers from such a problem that an advanced knowledge and know-how for setting the transformation rule including the memory color correction are required. The problem will be described below.

The correction processing system using the three-dimensional lookup table generally includes only a memory that stores the table data therein, and a circuit that calculates a transformed value from the table data. For that reason, the degree of freedom for setting the table data in the three-dimensional lookup table is very high. In the setting of the table data in the three-dimensional lookup table, there is a need to set a correction range of a color existing in the periphery of the target color, and the transformation destination coordinates of the respective colors within the correction range, in addition to setting of a color (target color) to be subjected to the memory color correction, and the transformation destination of the color. For that reason, for example, in the case of setting the above-mentioned table data related to the memory color correction, a setter cannot conduct appropriate setting unless the setter holds the advanced knowledge and know-how for the memory color correction.

If the setter sets the table data without holding satisfactory knowledge or know-how to correct the memory color, there is a risk that a spatial distortion may occur in the corrected image without ensuring continuity within the three-dimensional color space. When an image having a gentle gradation of color or brightness is input to an image processing apparatus having the above table data, there is a risk that the image processing apparatus may unavoidably output an image having an outline which does not originally exist, or an image having a degraded gradation characteristic.

Both of the image correcting techniques disclosed in Japanese Unexamined Patent Publication No. 2010-118881 and International Publication No. WO2004/032524 assume that the setter sequentially sets the table data. For that reason, if the setter does not have the satisfactory know-how and knowledge related to the color correction, there is a risk that the setter may not conduct an intended correction.

As described above, when the memory color correction is conducted with reference to the three-dimensional lookup table, the problem occurs if the setter of the lookup table has no satisfactory know-how and knowledge. However, the above problem occurs not only in the correction using the three-dimensional lookup table, but also in the setting of an arbitrary transformation rule required when conducting the color correction in the color space. Further, the problem is not limited to the correction intended for the memory color correction, but common to a case of conducting correction (coordinate transfer in the color space) of the pixel data included in an image.

That is, in the case of conducting the correction (coordinate transfer in the color space) of the pixel data (pixel value) included in the image, in order to calculate the correction range (range of the coordinate points where transfer occurs) that meets a desired correction purpose, and set the transfer distance and direction of the respective coordinate points for transfer, the advanced knowledge is required. When the user has the advanced knowledge, there arises such a problem that appropriate setting is not conducted.

According to one aspect of the present invention, there is provided an image processing apparatus including: a transformation unit that transforms color information on an input image signal on the basis of a transformation rule; a correction range calculation unit that calculates a correction range in a predetermined color space on the basis of a positional relationship between source coordinates and destination coordinates in the color space; and a point-based transfer distance calculation unit that calculates the transformation destination coordinates at respective points on the basis of the positional relationship between the source coordinates and the destination coordinates, and a positional relationship between coordinates at the respective points within the correction range and the source coordinates to reflect the calculated transformation destination coordinates on the transformation rule.

According to another aspect of the present invention, there is provided an image processing method of transforming color information on an input image signal on the basis of a transformation rule, including: calculating a correction range in a predetermined color space on the basis of a positional relationship between source coordinates and destination coordinates in the color space; and calculating the transformation destination coordinates at respective points on the basis of the positional relationship between the source coordinates and the destination coordinates, and a positional relationship between coordinates at the respective points within the correction range and the source coordinates to reflect the calculated transformation destination coordinates on the transformation rule.

According to still another aspect of the present invention, there is provided an image processing program causing a computer to execute, including: transforming color information on an input image signal on the basis of a transformation rule; calculating a correction range in a predetermined color space on the basis of a positional relationship between source coordinates and destination coordinates in the color space; and calculating the transformation destination coordinates at respective points on the basis of the positional relationship between the source coordinates and the destination coordinates, and a positional relationship between coordinates at the respective points within the correction range and the source coordinates to reflect the calculated transformation destination coordinates on the transformation rule.

In the present invention, the correction range calculation unit automatically calculates the correction range according to the positional relationship between the source coordinates and the destination coordinates. Further, the point-based transfer distance calculation unit calculates the transformation destination coordinates at the respective lattice points within the correction range according to the positional relationship between the source coordinates and the destination coordinates, and the positional relationship between the coordinates at the respective points within the correction range and the source coordinates to reflect the calculated transformation destination coordinates on the transformation rule (the three-dimensional lookup table in this embodiment). In this case, a user has only to provide the information on the source coordinates and the destination coordinates. As a result, the user can realize the correction processing in the color space without having the knowledge related to the setting of the correction range and the knowledge related to the transfer distances of the respective points.

According to the present invention, there can be provided the image processing apparatus, the image processing method, and the image processing program which can calculate the correction range (range of the coordinate points where transfer occurs) that meets the desired correction purpose, and set the transfer distance and direction of the respective coordinate points for transfer, without requiring the advanced knowledge, in the case of conducting the correction (coordinate transfer in the color space) of the pixel data (pixel value) included in the image.

BRIEF DESCRIPTION OF THE DRAWINGS

FIGS. 9A and 9B are diagrams illustrating a concept of a correction direction in the color space;

FIG. 16 is a block diagram illustrating a configuration of a correction range calculation unit according to a third embodiment of the present invention;

DETAILED DESCRIPTION

First Embodiment

Figure 1:
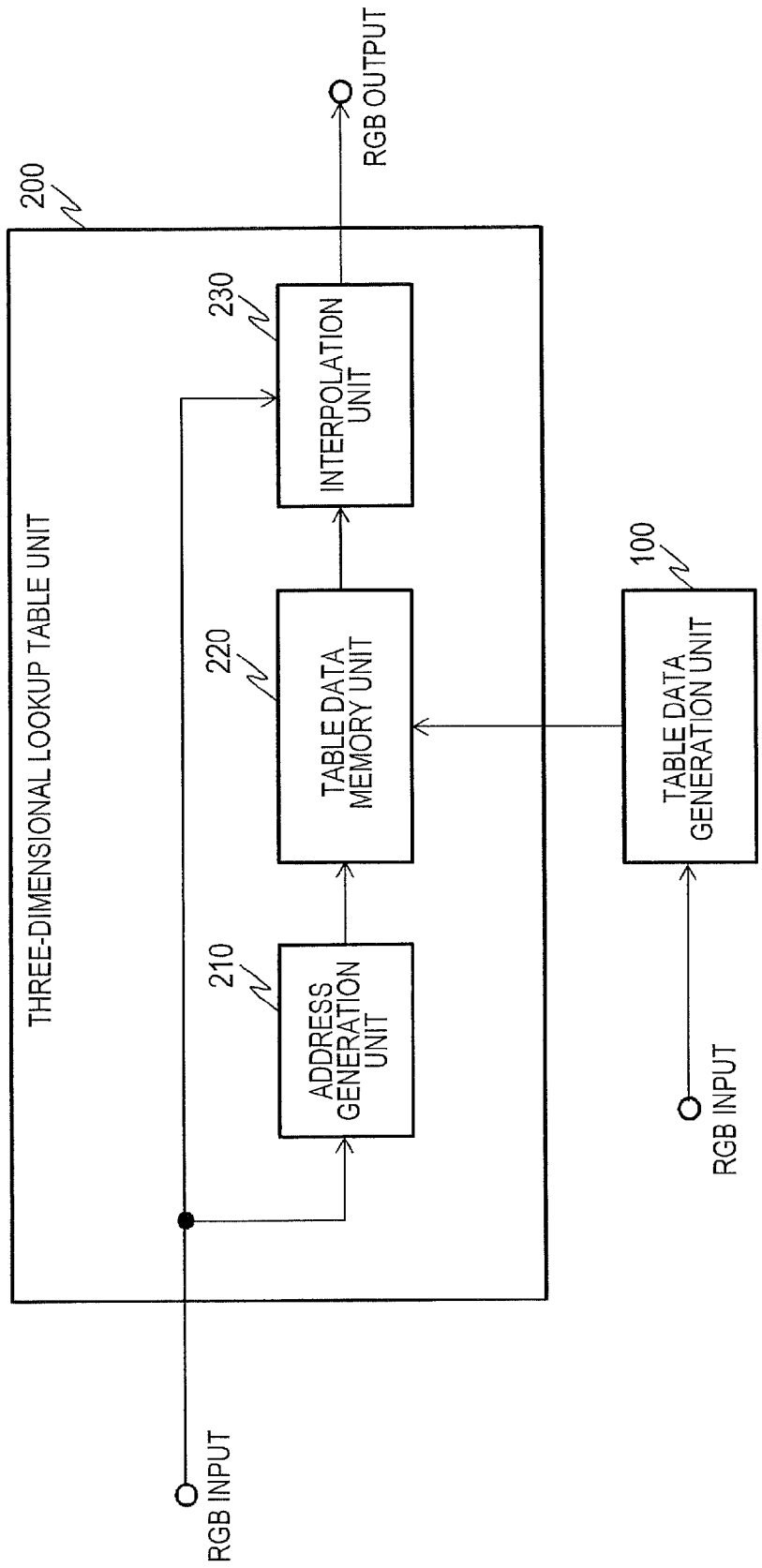
FIG. 1 is a block diagram illustrating a configuration of an image processing apparatus according to a first embodiment of the present invention.

Hereinafter, an embodiment of the present invention will be described with reference to the accompanying drawings. FIG. 1 is a block diagram illustrating a configuration of an image processing apparatus according to this embodiment.

An image processing apparatus 1 includes a table data generation unit 100 and a three-dimensional lookup table unit 200. The three-dimensional lookup table unit 200 includes an address generation unit 210, a table data memory unit 220, and an interpolation unit 230.

The three-dimensional lookup table unit 200 holds a three-dimensional lookup table, and transforms an input RGB signal. The three-dimensional lookup table unit 200 conducts a general memory color correction with the use of the three-dimensional lookup table. In this example, the three-dimensional lookup table held by the three-dimensional lookup table unit 200 is a three-dimensional lookup table in a general RGB space having lattice points such as 9×9×9 or 17×17×17 with a precision of 8 bits or 10 bits. The three-dimensional lookup table unit 200 holds correspondence relationships of the same number as that of the lattice points such as to allow lattice point coordinates (R1, G1, B1) in the RGB space to transfer to (R2, G2, B2). A method of interpolating the lattice points within the three-dimensional lookup table unit 200 (method of calculating the destination of the coordinates in the color space not included in the lattice point) may use a linear interpolation method or a cubic interpolation method in the general three-dimensional space.

The memory color correction processing designates a specific color region within the three-dimensional color space to conduct correction. For that reason, the correction can be conducted with higher precision as the number of lattice points is larger. For that reason, eight lattice points in the three-dimensional lookup table should be the number of lattice points of 9×9×9 or more. With this configuration, the memory color correction sustainable in real use can be implemented.

Figure 2:
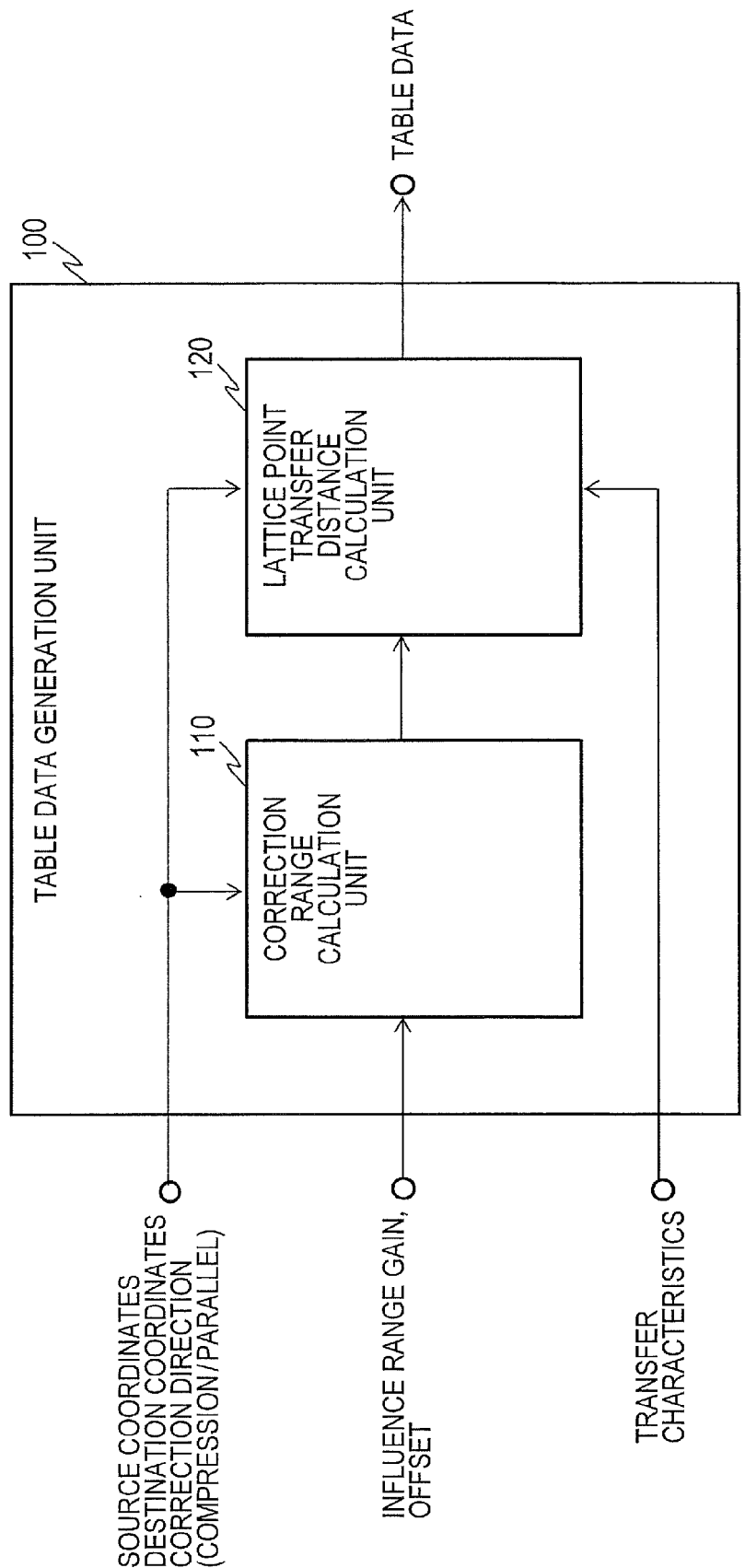
FIG. 2 is a block diagram illustrating a configuration of a table data generation unit according to the first embodiment of the present invention.

Subsequently, a description will be given of a configuration of the table data generation unit 100 with reference to FIG. 2. The table data generation unit 100 includes a correction range calculation unit 110 and a lattice point transfer distance calculation unit 120. The user inputs, to the table data generation unit 100, three set values including source coordinates (coordinate points on the RGB coordinates) of a color to be subjected to the memory color correction, destination coordinates (coordinate points on the RGB coordinates), and a correction direction (compression direction/parallel direction). The user may further set influence range gain and offset, and transfer characteristics. If no setting is conducted, a default value may be used. Likewise, if no correction direction is set, a default value (for example, compression direction) may be used.

The correction range calculation unit 110 is a processing unit for calculating a range (correction range) in the color space in which the memory color correction is conducted on the basis of the above-mentioned three set values (the source coordinates, the destination coordinates, and the correction direction). If the user feels that the correction range calculated by the correction range calculation unit 110 is improper (too wide, too narrow), the user can adjust the influence range gain and offset to adjust the correction range. The details will be described later.

The correction range calculation unit 110 supplies the calculated correction range (a range in which the coordinates in the color space are changed with the memory color correction) to the lattice point transfer distance calculation unit 120. The lattice point transfer distance calculation unit 120 automatically calculates the transfer distances of the respective lattice points within the correction range, and generates the table data of the three-dimensional lookup table on the basis of the transfer distance.

In detail, the lattice point transfer distance calculation unit 120 calculates the degree of influence (an index value of the transfer distance of each lattice point, which will be described in detail later) on the basis of a distance between the source coordinates which is a center of the transfer and the coordinates at each lattice point. The degree of influence calculated from the lattice point closer to the source coordinates becomes larger. The degree of influence calculated from the lattice point longer in the distance from the source coordinates becomes smaller. The degree of influence calculated from the lattice point outside the influence range (outside the correction range) becomes 0.

The lattice point transfer distance calculation unit 120 calculates the degree of influence at each of the lattice points, and calculates the transfer distance of each lattice point according to the degree of influence. The lattice point transfer distance calculation unit 120 adds the transfer distance calculated for each of the lattice points to the coordinate value at each of the lattice points to generate the table data.

If the user intends to adjust the transfer distance calculated from the degree of influence, the user may adjust an input value of the transfer characteristics. The details of the transfer characteristics will be described later.

Subsequently, a significance of calculating the correction range and the transfer distance of each lattice point will be described on the basis of the above input (the source coordinates, the destination coordinates) prior to description of the detailed configurations and operations of the correction range calculation unit 110 and the lattice point transfer distance calculation unit 120.

In the image processing apparatus 1 according to this embodiment, when the user conducts the memory color correction, the user sets the color coordinates of the source which is the center of the transfer, and sets the color coordinates of the destination indicative of how the color is colored. Upon receiving the setting, the correction range calculation unit 110 calculates the correction range. That is, the correction range calculation unit 110 also selects colors (coordinates) existing around the set two color coordinates as the transfer target. The two reasons for the above selection will be described below.

The first reason is because the continuity within the three-dimensional color space is ensured to prevent a spatial distortion so that the gradation characteristics are not deteriorated.

The second reason is because the color to be corrected is not concentrated in a certain point in the three-dimensional space, but requires correction to a certain color region. For example, this is because when the memory color correction of blue is conducted, blue to be corrected is not concentrated in a certain point in the three-dimensional space, but a given color region around that point is to be corrected.

In general, for example, when the color region of the flesh color to be subjected to the memory color correction is set, sample data of the flesh color existing in the world is acquired. Then, statistical data of a preferable flesh color is collected aside from the acquired data. In addition, those data is analyzed by using the advanced know-how to determine which flesh color is set as the center (the source coordinates), what range (correction range) is defined as the flesh color, and which color is set as a preferable flesh color (the destination).

However, just the flesh color still refers to a variety of races. For that reason, when all of the flesh color regions are defined, the regions become remarkably widened. Further, a change in the flesh color due to a light source of photographing environments, and a change in how to see the flesh color due to a background color also occur. For that reason, it is impossible to conduct absolutely preferable setting in any cases. Further, there are many cases in which the memory colors are originally ambiguously defined. For that reason, the memory colors may be largely different depending on the user's leaning or the regionality. In summary, it is frequently very difficult to set the source coordinates and the destination coordinates to be subjected to the correction of the memory color. However, it is also a fact that when the color of an image is corrected to a tendency of the preferred color and brightness, a certain amount of correction effect is obtained.

Hence, in the image processing apparatus according to this embodiment, if each user sets "correction is intended to be conducted to approach this color with a focus on this color" (that is, sets the coordinates of the above-mentioned source and destination), the correction range calculation unit 110 automatically calculates the correction range. Also, the lattice point transfer distance calculation unit 120 automatically calculates the transfer distance of each lattice point within the correction range. As a result, in the image processing apparatus 1 according to this embodiment, there can be easily provided a unit for correcting the memory color with no problem real-operationally even if the user does not hold the above-mentioned statistical data and the advanced adjustment know-how.

Figure 3:
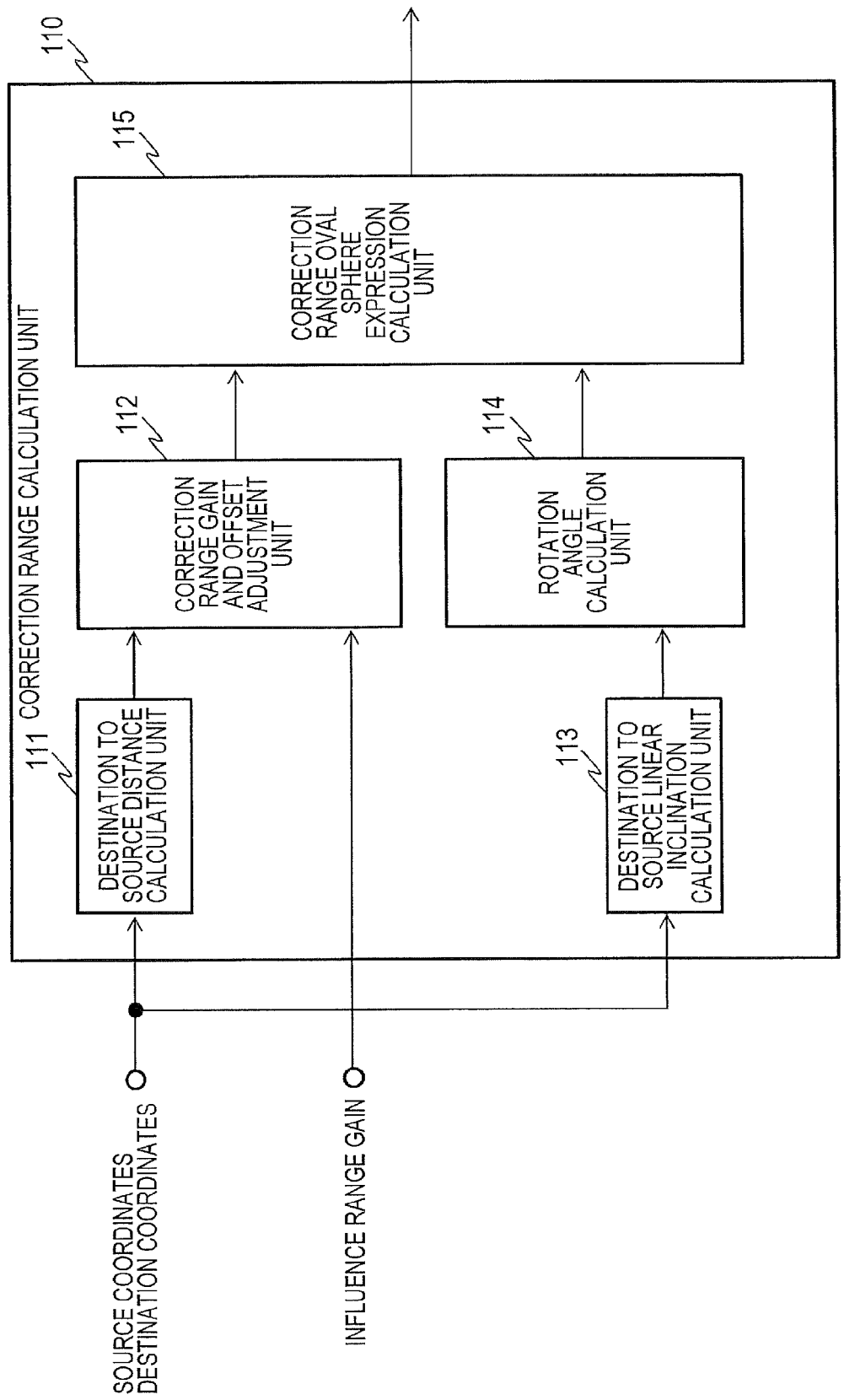
FIG. 3 is a block diagram illustrating a configuration of a correction range calculation unit according to the first embodiment of the present invention.

Subsequently, a description will be given of a detailed configuration of the correction range calculation unit 110 with reference to FIG. 3. FIG. 3 is a block diagram illustrating a configuration of the correction range calculation unit 110. The correction range calculation unit 110 includes a destination to source distance calculation unit 111, a correction range gain and offset adjustment unit 112, a destination to source line inclination calculation unit 113, a rotation angle calculation unit 114, and a correction range oval sphere expression calculation unit 115. FIGS. 4A to 6 are diagrams illustrating the source coordinates, the destination coordinates, and the correction range in the color space. Hereinafter, those drawings will be appropriately referred to for description.

The destination to source distance calculation unit 111 receives the source coordinates and destination coordinates set by the user. The destination to source distance calculation unit 111 subtracts the source coordinates from the destination coordinates to calculate a distance between the destination coordinates and the source coordinates in the color space. The source coordinates, the destination coordinates, and the distance from the destination coordinates to the source coordinates are defined as follows to represent formulae for computation. Source coordinates: O (Ro, Go, Bo), Destination coordinates: T (Rt, Gt, Bt), source to destination distance: Lto (Rlto, Glto, Blto) Lto=(Rt-Ro, Gt-Go, Bt-Bo).

Figure 4A:
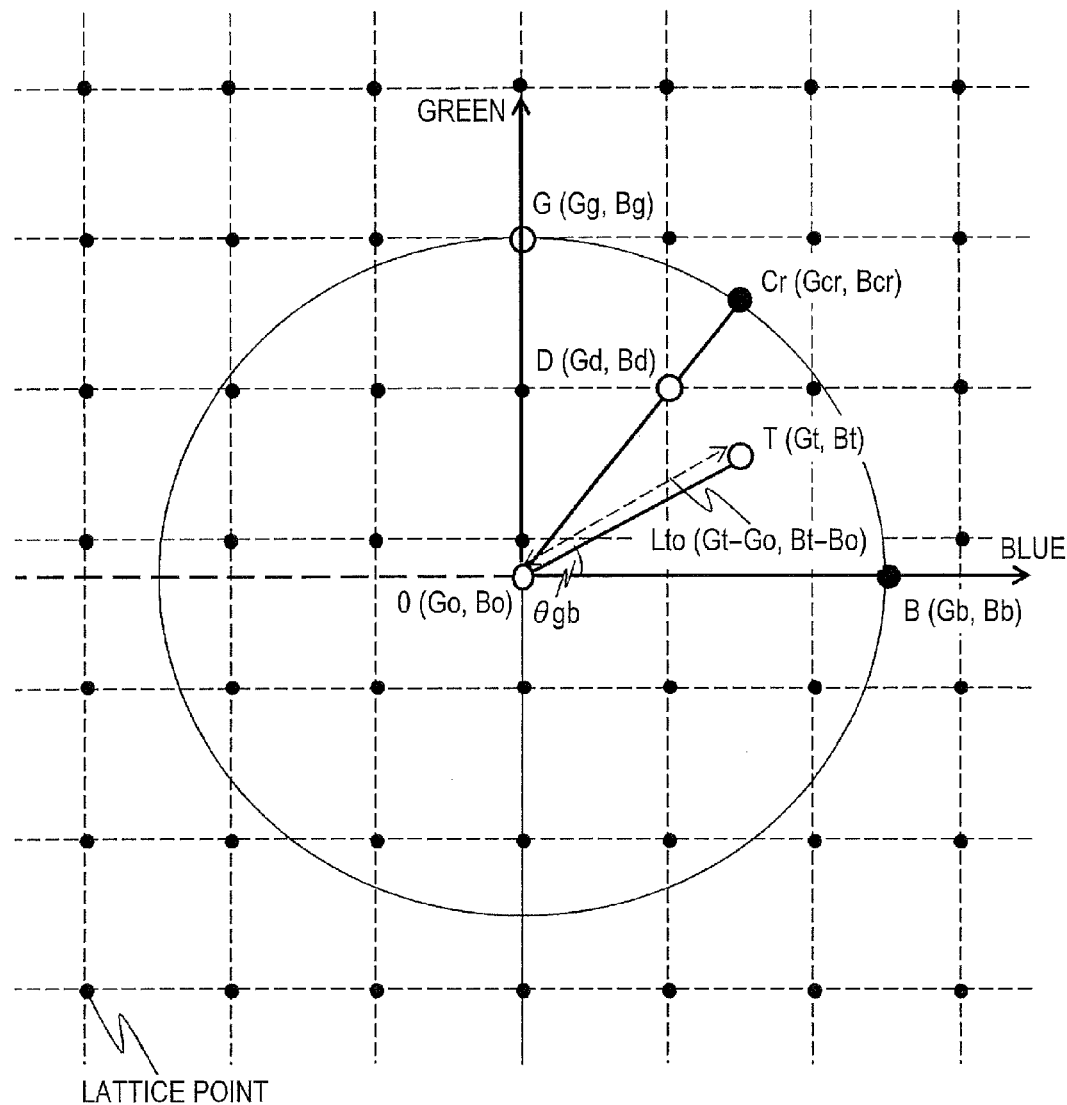
FIGS. 4A and 4B are diagrams illustrating a concept of a distance between source coordinates and destination coordinates in a color space (GB cross-section)
Figure 4B:
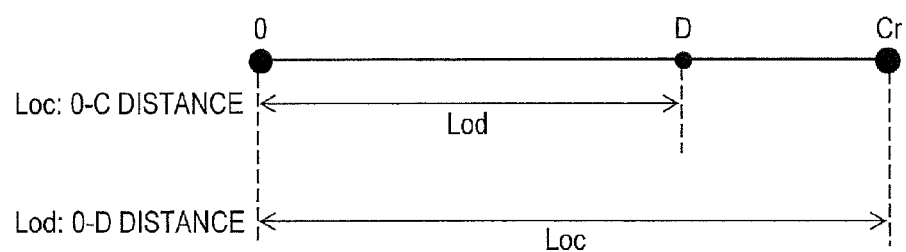

FIGS. 4A and 4B illustrate a concept of a distance Lto between the source coordinates and the destination coordinates in the color space (GB cross-section). In FIGS. 4A and 4B, for limitation of the drawings, two-dimensional cross-sections are illustrated, but the destination to source distance calculation unit 111 calculates the distance in the three-dimensional space.

The destination to source distance calculation unit 111 supplies the calculated source to destination distance (Lto) to the correction range gain and offset adjustment unit 112.

The correction range gain and offset adjustment unit 112 determines the correction range for each axis of the respective RGB on the basis of the supplied source to destination distance (Lto). A correction range gain and a correction range offset are appropriately set by the user. When no setting is conducted, default values are used. Hereinafter, a correction range E, a correction range gain Egain, and a correction range offset Eofs are defined to express Formulae for computation (Ex. 1) to (Ex. 3) used by the correction range gain and offset adjustment unit 112. Correction range: E (Re, Ge, Be), Correction range gain: Egain, and Correction range offset: Eofs $$Re = Rlto \times Egain + Eofs \quad \text{(Ex. 1)}$$

$$Ge = Glto \times Egain + Eofs \quad \text{(Ex. 2)}$$

$$Be = Blto \times Egain + Eofs \quad \text{(Ex. 3)}$$

It is assumed that the correction range gain Egain can be adjusted between "1" and "5" by the user, but is set to about "3". It is assumed that the correction range offset Eofs can be adjusted between "8" and "64" by the user in the case of 8-bit (256) gradations, but is set to about "16".

The user can adjust the correction range gain Egain and the correction range offset Eofs to automatically set the magnitude of the correction range E according to the distance Lto between the source coordinates and the destination coordinates. The range of the correction range E is wider as the correction range gain Egain and the correction range offset Eofs are larger (oval sphere range becomes larger in FIGS. 4A and 4B). Because the correction range gain Egain is not a value of 1 or lower, the source coordinates and the destination coordinates are included within the correction range E in principle. The correction range gain and offset adjustment unit 112 supplies the calculated correction range E to the correction range oval sphere expression calculation unit 115.

The destination to source line inclination calculation unit 113 calculates an inclination (Δrg) of the RG cross-section and an inclination (Δgb) of the GB cross-section according to the source coordinates and the destination coordinates. In more detail, the destination to source line inclination calculation unit 113 calculates the inclination (Δrg) of the RG cross-section according to positional relationships of an R coordinate (Ro) and a G coordinate (Go) of the source coordinates, and an R coordinate (Rt) and a G coordinate (Gt) of the destination coordinates. Likewise, the destination to source line inclination calculation unit 113 calculates the inclination (Δgb) of the GB cross-section according to positional relationships of the G coordinate (Go) and a B coordinate (Bo) of the source coordinates, and the G coordinate (Gt) and a B coordinate (Bt) of the destination coordinates. In more detail, the destination to source line inclination calculation unit 113 calculates the inclination (Δrg) of the RG cross-section and the inclination (Δgb) of the GB cross-section with the use of the following formulae for computation (Ex. 4) and (Ex. 5).

$$\Delta rg = \frac{Gt - Go}{Rt - Ro} \quad \text{(Ex. 4)}$$

$$\Delta gb = \frac{Bt - Bo}{Gt - Go} \quad \text{(Ex. 5)}$$

The destination to source line inclination calculation unit 113 supplies the calculated inclination (Δrg) of the RG cross-section and the calculated inclination (Δgb) of the GB cross-section to the rotation angle calculation unit 114. FIG. 4A illustrates the inclination (Δgb) of the GB cross-section.

The rotation angle calculation unit 114 calculates an angle (θrg, θgb) by which an oval sphere configured by an outer periphery of the correction range E rotates, according to the supplied inclination (Δrg) of the RG cross-section and the supplied inclination (Δgb) of the GB cross-section. In more detail, the rotation angle calculation unit 114 calculates the rotation angle (θrg, θgb) with the use of the following formulae for computation (Ex. 6) and (Ex. 7).

$$\theta rg = \frac{a\tan(\Delta rg) \times 180}{\pi}(°), \quad \text{(Ex. 6)}$$
$$Rt - Ro = 0 \text{ の場合は } 90(°)$$

$$\theta gb = \frac{a\tan(\Delta gb) \times 180}{\pi}(°), \quad \text{(Ex. 7)}$$
$$Gt - Go = 0 \text{ の場合は } 0(°)$$

The correction range oval sphere expression calculation unit 115 is a processing unit that calculates an oval sphere expression of the correction range. The correction range oval sphere expression calculation unit 115 axially rotates the oval sphere configured by the outer periphery of the correction range E calculated by the correction range gain and offset adjustment unit 112 by the angle (θrg, θgb) calculated by the rotation angle calculation unit 114 about the respective axes to calculate the oval sphere expression of a final correction range E. In more detail, the correction range oval sphere expression calculation unit 115 rotates a coordinate variable (R0, G0, B0) about an RG axis with the aid of the following expression (Ex. 8) to calculate coordinates (R1, G1, *). The correction range oval sphere expression calculation unit 115 rotates the coordinates (R1, G1, *) about an RG axis with the aid of the following expression (Ex. 9) to calculate coordinates (R1, G2, B1). The correction range oval sphere expression calculation unit 115 calculates the formula for computation (Ex. 10) of the axially rotated oval sphere expression according to the coordinate point (R1, G2, B1). The correction range oval sphere expression calculation unit 115 calculates the formula for computation (Ex. 10) of the axially rotated oval sphere expression according to the coordinate point (R1, G2, B1).

$$R1 = \cos\theta rg \times R0 - \sin\theta rg \times G0 \quad \text{(Ex. 8)}$$
$$G1 = \sin\theta rg \times R0 + \cos\theta rg \times G0$$

$$G2 = \cos\theta gb \times G1 - \sin\theta gb \times B0 \quad \text{(Ex. 9)}$$
$$B1 = \sin\theta gb \times G1 + \cos\theta gb \times B0$$

$$\frac{R1^2}{Re^2} + \frac{G2^2}{Ge^2} + \frac{B1^2}{Be^2} = 1 \quad \text{(Ex. 10)}$$

The correction range oval sphere expression calculation unit 115 supplies the oval sphere expression of the calculated correction range E to the lattice point transfer distance calculation unit 120 (intersection point calculation unit 122).

Figure 5:
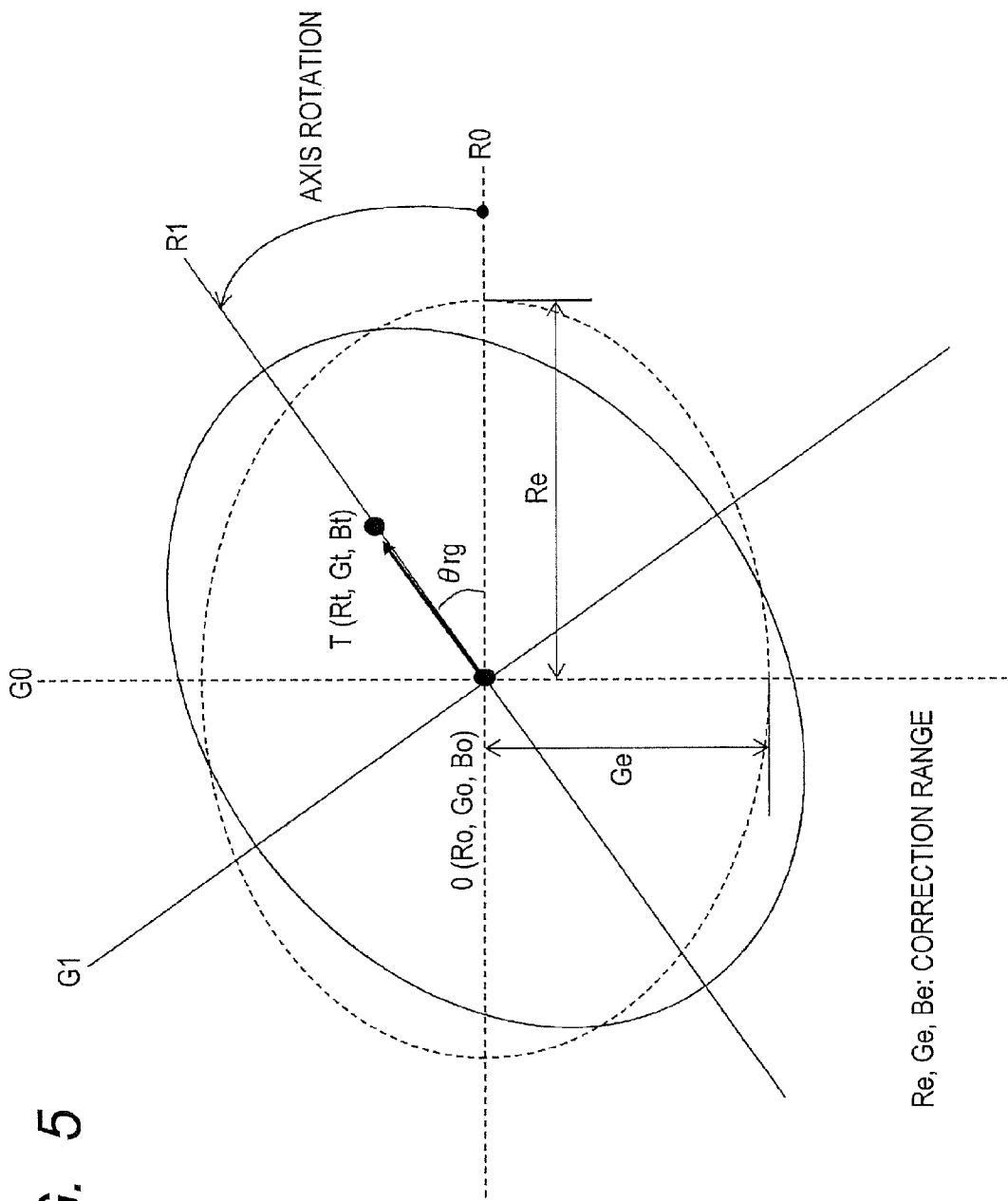
FIG. 5 is a diagram illustrating a concept of rotation of a correction range by a correction range calculation unit according to the first embodiment of the present invention.

FIG. 5 is a diagram illustrating a concept of rotation of the correction range E. FIG. 5 illustrates the rotation concept of the RG cross-section. As illustrated in the figure, the correction range E is rotated according to the positional relationship between the source coordinates and the destination coordinates. That is, the correction range oval sphere expression calculation unit 115 rotates the correction range E so that a line connecting the source coordinates and the destination coordinates is parallel to a long side direction of the oval sphere.

Figure 6:
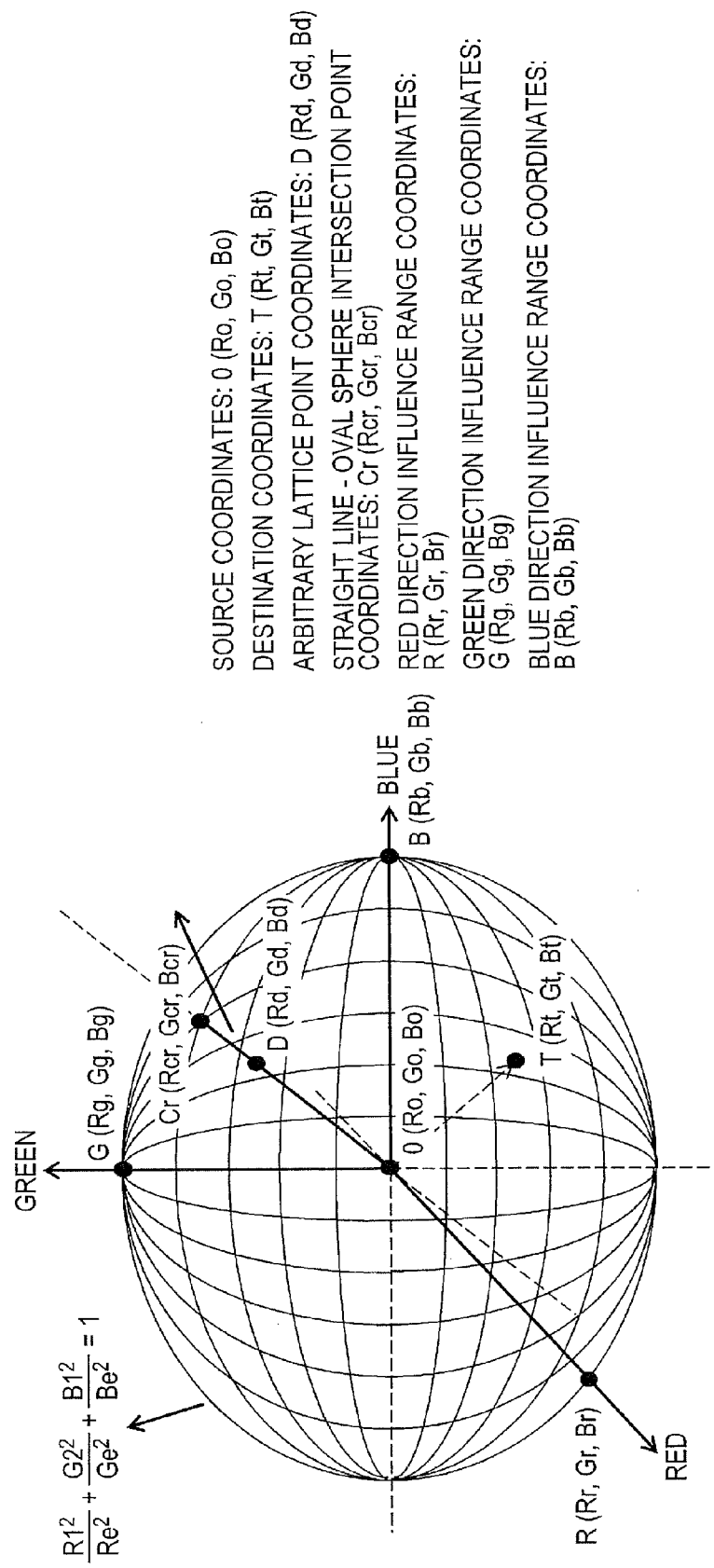
FIG. 6 is a diagram three-dimensionally illustrating a relationship of the source coordinates, the destination coordinates, and an oval sphere indicative of the correction range.

FIG. 6 is a diagram three-dimensionally illustrating a relationship of the source coordinates, the destination coordinates, and the oval sphere indicative of the correction range. As illustrated in the figure, the oval sphere has the source coordinates and the destination coordinates inside thereof.

As described above, the user sets the source coordinates and the destination coordinates point by point. The correction range calculation unit 110 automatically calculates the correction range E through a series of processing described above. In the above-mentioned technique for calculating the correction range E, a center of the oval sphere indicative of the correction range is correction source coordinates. However, the above-mentioned calculating technique is merely one example of the technique for calculating the oval sphere of the correction range E, and the center of the oval sphere may be intermediate coordinates between the source coordinates and the destination coordinates, or may be coordinates close to the source coordinates (destination coordinates).

Further, in the above technique for calculating the correction range E, the correction range is indicated by an oval sphere. However, the expression representative of the correction range E does not always need to be a complicated mathematical expression such as the oval sphere expression. The expression may be a simple mathematical expression such as a linear expression as long as the expression represents a range corresponding to the above oval sphere expression (that is, a range calculated on the basis of the positional relationship between the source coordinates and the destination coordinates). The correction range E represented by the linear expression is, for example, a regular solid (octagon) and a cuboid (octagon, decagon, dodecagons).

Figure 7:
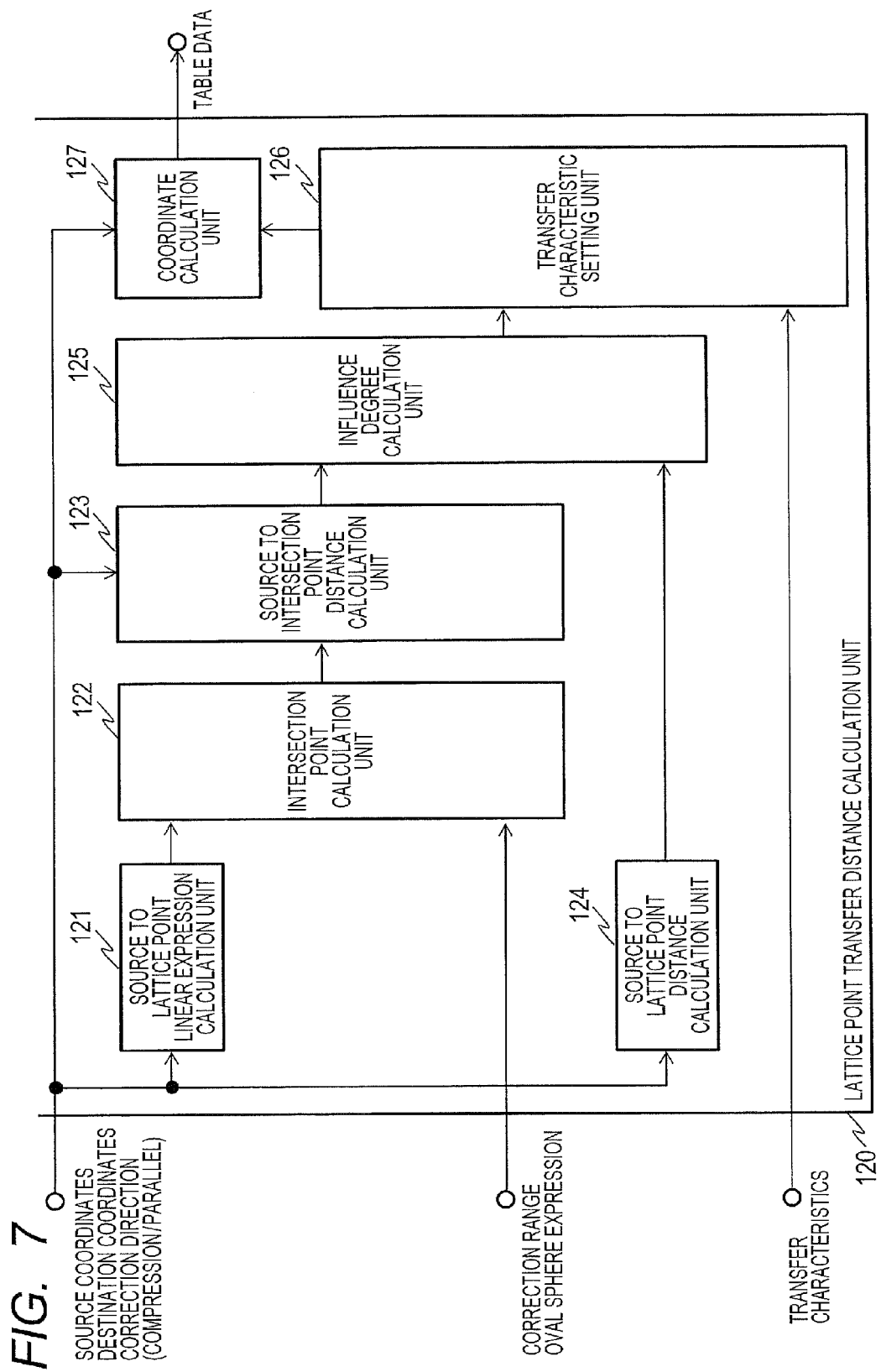
FIG. 7 is a block diagram illustrating a configuration of a lattice point transfer distance calculation unit according to the first embodiment of the present invention.

Subsequently, the configuration and operation of the lattice point transfer distance calculation unit 120 will be described with reference to FIG. 7. FIG. 7 is a block diagram illustrating the configuration of the lattice point transfer distance calculation unit 120. First, an outline of the processing of the lattice point transfer distance calculation unit 120 will be described.

The lattice point transfer distance calculation unit 120 calculates the transfer distances of the respective lattice points within the oval sphere represented by the oval sphere expression of the correction range E which is input from the correction range oval sphere expression calculation unit 115. For example, the lattice point transfer distance calculation unit 120 calculates the transfer distances of the respective lattice points within the correction range of FIG. 4A.

In detail, the lattice point transfer distance calculation unit 120 first calculates intersection points between a line that passes through the source coordinates of each lattice point, and the oval sphere represented by the input oval sphere expression. The lattice point transfer distance calculation unit 120 then calculates a distance (normalization distance) between the intersection point and the source coordinates. The lattice point transfer distance calculation unit 120 also calculates a distance between the source coordinates and the lattice point. The lattice point transfer distance calculation unit 120 calculates the degree of transfer influence according to a ratio of the distance (distance between the source coordinates and the lattice point) and the normalization distance. The lattice point transfer distance calculation unit 120 then calculates the transfer distance of the lattice point for each of the RGB coordinates according to a relationship of the degree of influence, the source coordinates, the destination coordinates, and the lattice point coordinates. The lattice point transfer distance calculation unit 120 adds the transfer distance for each of the RGB coordinates to the lattice point coordinates to calculate the coordinates of the transferred lattice point. The transferred coordinates become the table data of the memory color correction.

In the following description, the lattice points (coordinate arrangement where all of distances to the vertical and horizontal adjacent lattice points are uniform) are dealt with. However, the present invention is not always limited to this configuration. The lattice point transfer distance calculation unit 120 (point-based transfer distance calculation unit) may calculate the transfer distance of each coordinate point having alignments other than the lattice points. In this case, the three-dimensional lookup table unit 200 may conduct interpolation processing with reference to a distance relationship of the respective coordinate points.

Subsequently, a description will be given of the detailed configuration of the lattice point transfer distance calculation unit 120 and the operation of the respective configuration processing units. The lattice point transfer distance calculation unit 120 includes a source to lattice point linear expression calculation unit 121, an intersection point calculation unit 122, a source coordinates to intersection point distance calculation unit 123, a source to lattice point linear distance calculation unit 124, an influence degree calculation unit 125, a transfer characteristic setting unit 126, and a coordinate calculation unit 127.

The source to lattice point linear expression calculation unit 121 calculates a linear expression of a line that connects the source coordinates and each of the coordinates included within the correction range E. In this example, when arbitrary lattice point coordinates D included in the correction range E, and a coordinate variable INPUT are defined as follows, the linear expression is calculated as the following expression (Ex. 11) through a general three-dimensional straight-line equation.

Lattice point coordinates: D (Rd, Gd, Bd) within the correction range oval sphere
Coordinate variable: (R0, G0, B0)

$$\frac{R0}{Rd-Ro} = \frac{G0}{Gd-Go} = \frac{B0}{Bd-Bo} = 1, \quad \text{(Ex. 11)}$$

$$G0 = \frac{Gd-Go}{Rd-Ro} \times R0,$$

$$B0 = \frac{Bd-Bo}{Rd-Ro} \times R0$$

$$R1^2 = \left(\cos^2\theta rg - 2 \times \cos\theta rg \times \sin\theta rg \times \left(\frac{Gd-Go}{Rd-Ro}\right) + \sin^2\theta rg \times \left(\frac{Gd-Go}{Rd-Ro}\right)^2\right) \times R0^2$$

$$= A \times R0^2$$

The source to lattice point linear expression calculation unit 121 supplies the calculated linear expression (Ex. 11) at each of the lattice points to the intersection point calculation unit 122.

The intersection point calculation unit 122 receives the oval sphere expression (oval sphere expression after axial rotation, (Ex. 10)) of the correction range E which is input from the correction range oval sphere expression calculation unit 115, and the linear expression (Ex. 11) calculated from each of the lattice points. The intersection point calculation unit 122 calculates the intersection point between the oval sphere (oval sphere of the correction range E) and the line (line connecting the source coordinates and an arbitrary lattice point) by assigning the linear expression into the oval sphere expression. Assignment expressions will be represented as follows. First, an assignment expression (Ex. 12) related to R1 is represented.

$$R1^2 = (\cos\theta rg \times R0 - \sin\theta rg \times G0)^2 \quad \text{(Ex. 12)}$$

$$= \cos^2\theta rg \times R0^2 - 2 \times \cos\theta rg \times R0 \times \sin\theta rg \times G0 + \sin^2\theta rg \times G0^2$$

$$= \cos^2\theta rg \times R0^2 - 2 \times \cos\theta rg \times R0 \times \sin\theta rg \times \left(\frac{Gd - Go}{Rd - Ro}\right) \times R0 + \sin^2\theta rg \times \left(\frac{Gd - Go}{Rd - Ro}\right)^2 \times R0^2$$

$$= \left(\cos^2\theta rg - 2 \times \cos\theta rg \times \sin\theta rg \times \left(\frac{Gd - Go}{Rd - Ro}\right) + \sin^2\theta rg \times \left(\frac{Gd - Go}{Rd - Ro}\right)^2\right) \times R0^2$$

$$= A \times R0^2$$

In Expression 12, a part of parts is replaced with a variable A. Likewise, an assignment expression (Ex. 13) related to G2 is represented. The assignment manner is identical with that of Expression 12, and therefore the details of assignment processing are simplified for description.

$$G2^2 = \left(\cos^2\theta gb \times \left(\sin\theta rg + \cos\theta rg \times \left(\frac{Gd - Go}{Rd - Ro}\right)\right)^2 - 2 \times \cos\theta gb \times \sin\theta gb \times \left(\frac{Bd - Bo}{Rd - Ro}\right) \times (\sin\theta rg + \cos\theta rg \times \left(\frac{Gd - Go}{Rd - Ro}\right)) + \sin^2\theta gb \times \left(\frac{Bd - Bo}{Rd - Ro}\right)^2\right) \times R0^2 \quad \text{(Ex. 13)}$$

$$= B \times R0^2$$

In Expression 13, a part of parts is replaced with a variable B. Likewise, an assignment expression (Ex. 14) related to B1 is represented. In Expression 14, a part of parts is replaced with a variable C.

$$B1^2 = \left(\sin^2\theta rg \times \left(\sin\theta rg + \cos\theta rg \times \left(\frac{Gd - Go}{Rd - Ro}\right)\right)^2 + 2 \times \cos\theta gb \times \sin\theta gb \times \left(\frac{Bd - Bo}{Rd - Ro}\right) \times \left(\sin\theta rg + \cos\theta rg \times \left(\frac{Gd - Go}{Rd - Ro}\right)\right) + \cos^2\theta gb \times \left(\frac{Bd - Bo}{Rd - Ro}\right)^2\right) \times R0^2 \quad \text{(Ex. 14)}$$

$$= C \times R0^2$$

Through the above expressions, an intersection point Cr can be found by the following expression (Ex. 15). Intersection point Cr (Rcr, Gcr, Bcr)

$$R_{CF} = \frac{Re \times Ge \times Be}{\sqrt{Ge^2 \times Be^2 \times A + Re^2 \times Be^2 \times B + Re^2 \times Ge^2 \times C}} \quad \text{(Ex. 15)}$$

Also, in the case of Rd=Ro, division by zero occurs in the linear expression (Ex. 11). Hence, the above-mentioned Rcr and B0 are represented by the following expression (Ex. 16).

$$Rcr = 0, \quad \text{(Ex. 16)}$$
$$B0 = \frac{Bd - Bo}{Gd - G0} \times G0$$

When Expression 16 is assigned into the oval sphere expression (Ex. 10), the following expressions (Ex. 17) to (Ex. 19) are obtained.

$$R1^2 = \sin^2\theta rg \times G0^2 = A \times G0^2 \quad \text{(Ex. 17)}$$

$$G2^2 = \left(\cos^2\theta gb \times \cos^2\theta rg - 2 \times \cos\theta gb \times \sin\theta gb \times \cos\theta rg \times \left(\frac{Bd - Bo}{Gd - Go}\right) + \sin^2\theta gb \times \left(\frac{Bd - Bo}{Gd - Go}\right)^2\right) \times G0^2 = B \times G0^2 \quad \text{(Ex. 18)}$$

$$B1^2 = \left(\sin^2\theta gb \times \cos^2\theta rg + 2 \times \sin\theta gb \times \cos\theta gb \times \cos\theta rg \times \left(\frac{Bd - Bo}{Gd - Go}\right) + \cos^2\theta gb \times \left(\frac{Bd - Bo}{Gd - Go}\right)^2\right) \times G0^2 = C \times G0^2 \quad \text{(Ex. 19)}$$

Through the above Expressions 17 to 19, the intersection point Cr can be found by the following expression (Ex. 20).

$$Gcr = \frac{Re \times Ge \times Be}{\sqrt{Ge^2 \times Be^2 \times A + Re^2 \times Be^2 \times B + Re^2 \times Ge^2 \times C}} \quad \text{(Ex. 20)}$$

$$Rcr = 0,$$
$$Bcr = \frac{Bd - Bo}{Gd - Go} \times Gcr$$

Also, in the case of Gd=Go, division by zero occurs in the linear expression (Ex. 11). Hence, the above-mentioned Rcr and Bcr are represented by the following expression (Ex. 21).

$$Rcr = Gcr = 0 \quad \text{(Ex. 21)}$$

When Expression 21 is assigned into the oval sphere expression (Ex. 10), the following expressions (Ex. 22) to (Ex. 24) can be obtained.

$$R1^2 = A \times G0^2 (A=0) \quad \text{(Ex. 22)}$$

$$G2^2 = \sin^2\theta gb \times B0^2 = B \times B0^2 \quad \text{(Ex. 23)}$$

$$B1^2 = \cos^2\theta gb \times B0^2 = C \times B0^2 \quad \text{(Ex. 24)}$$

Through the above Expressions 22 to 24, the intersection point Cr can be found by the following expression (Ex. 25).

$$Bcr = \frac{Re \times Ge \times Be}{\sqrt{Ge^2 \times Be^2 \times A + Re^2 \times Be^2 \times B + Re^2 \times Ge^2 \times C}} = \quad \text{(Ex. 25)}$$

$$\frac{Re \times Ge \times Be}{\sqrt{Re^2 \times Be^2 \times \sin^2 \theta gb + Re^2 \times Ge^2 \times \cos^2 \theta gb}},$$

$$Rcr = Gcr = 0$$

As described above, the intersection point calculation unit 122 calculates the intersection point Cr corresponding to each of the lattice points. The intersection point calculation unit 122 supplies the coordinates of the calculated intersection point Cr (the intersection point between the oval sphere and the line connecting the lattice point and the source coordinates) corresponding to each of the calculated lattice points to the source coordinates to intersection point distance calculation unit 123.

The source coordinates to intersection point distance calculation unit 123 calculates a distance Loc between the source coordinates and the coordinates of the intersection point (intersection point between the oval sphere and the line connecting the lattice point and the source coordinates) corresponding to each of the lattice points. The source coordinates to intersection point distance calculation unit 123 calculates the distance Loc from the following expression (Ex. 26) with the use of the Pythagorean theorem.

$$Loc = \sqrt{(Rcr-Ro)^2 + (Gcr-Go)^2 + (Bcr-Bo)^2} \quad \text{(Ex. 26)}$$

The distance Loc represents a range in which transfer occurs centering on the source coordinates. For that reason, it is assumed that the distance Loc is a normalization distance in the transfer range. The source coordinates to intersection point distance calculation unit 123 supplies the normalization distance Loc calculated for each of the lattice points to the influence degree calculation unit 125.

The source to lattice point linear distance calculation unit 124 calculates a distance between the source coordinates O and an arbitrary lattice point D. The source to lattice point linear distance calculation unit 124 calculates a distance Lod from the following expression (Ex. 27) with the use of the Pythagorean theorem.

$$Lod = \sqrt{(Rd-Ro)^2 + (Gd-Go)^2 + (Bd-Bo)^2} \quad \text{(Ex. 27)}$$

The source to lattice point linear distance calculation unit 124 supplies the normalization distance Lod calculated for each of the lattice points to the influence degree calculation unit 125. FIG. 4B is a diagram illustrating a relationship between the normalization distance Loc and the distance Lod.

The influence degree calculation unit 125 calculates the degree of influence Ef used to calculate the transfer distance for each of the lattice points. The influence degree calculation unit 125 receives the above-mentioned normalization distance Loc and distance Lod for each of the lattice points. The transfer distance for each of the lattice points becomes larger as the degree of influence Ef is larger. The degree of influence Ef becomes maximum when being calculated from the vicinity of the source coordinates, and the intersection point Cr becomes 0 (a value at which there is no transfer). This is because the source coordinates become the center of transfer. The influence degree calculation unit 125 calculates the degree of influence Ef by the following Expression 28.

$$Ef = 1 - \frac{Lod}{Loc} \quad \text{(Ex. 28)}$$

The influence degree calculation unit 125 calculates the above-mentioned degree of influence Ef for each of the lattice points in the correction range E.

As a result, the transfer distance of each lattice point close to the source coordinates becomes larger, and the transfer distance becomes smaller as the lattice point is farther from the source coordinates. The transfer distance (the degree of influence Ef) of each lattice point on the correction range oval sphere becomes 0. As a result, the continuity within the three-dimensional color space is ensured. Since the continuity is ensured, the memory color correction having no color distortion can be conducted.

The influence degree calculation unit 125 supplies the calculated degree of influence Ef for each of the lattice points to the transfer characteristic setting unit 126.

The transfer characteristic setting unit 126 calculates transfer distance characteristics ME according to the degree of influence Ef for each of the lattice points. The transfer distance characteristics ME are a coefficient of the transfer distance for each of the lattice points. When it is assumed that the above-mentioned degree of influence Ef for each of the lattice points is a transfer distance, the transfer distance (transfer distance characteristics ME) becomes smaller as the lattice point is farther from the source coordinates. The transfer characteristic setting unit 126 calculates the transfer distance characteristics ME, for example, from the following Expression 29 according to the degree of influence Ef for each of the lattice points.

$$ME = 1 - (Ef-1)^2 \quad \text{(Ex. 29)}$$

Figure 8:
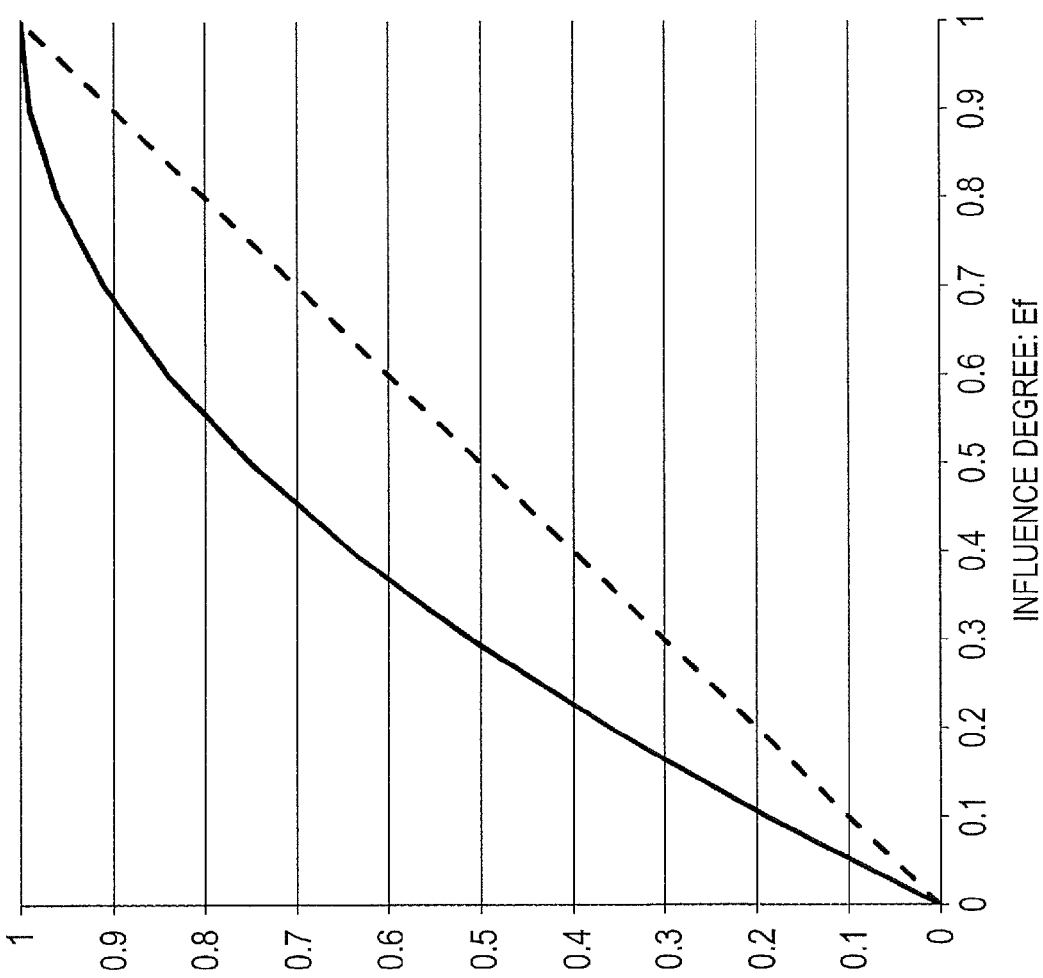
FIG. 8 is a graph illustrating a relationship between the degree of influence and transfer distance characteristics.

FIG. 8 is a graph illustrating a relationship between the degree of influence Ef and transfer distance characteristics ME. The transfer distance (transfer distance characteristics ME) is controlled from the above Expression 29 according to the degree of influence Ef. As illustrated in FIG. 8, the above transfer distance (transfer distance characteristics ME) becomes large as compared with a linear change in the degree of influence Ef. As a result, a more proper transfer distance can be set.

If the user does not satisfy the transfer distance characteristics ME calculated by the transfer characteristic setting unit 126, the user may appropriately adjust the transfer distance characteristics ME. That is, the user may appropriately set a formula for computation used in the transfer characteristic setting unit 126.

The transfer characteristic setting unit 126 supplies the calculated transfer distance characteristics ME for each of the lattice points to the coordinate calculation unit 127.

The coordinate calculation unit 127 calculates the transfer distance M (Mr, Mg, Mb) for each of the lattice points on the basis of the transfer distance characteristics ME for each of the lattice points, and adds the transfer distance M to each of the lattice point coordinates D to calculate corrected coordinates DC(DCr, DCg, DCb) of each lattice point. The coordinate calculation unit 127 receives a correction direction in addition to the transfer distance characteristics ME for each of the lattice points and each of the lattice point coordinates D. The correction direction is designated by the user to designate one of a compression direction and a parallel direction. Hereinafter, the correction direction will be described with reference to FIGS. 9A and 9B.

As illustrated in FIG. 9A, the compression direction is corrected to change the coordinate position so as to concentrate on the coordinates of one point designated by the user. As a result, even if any color is input, the memory color is so corrected as to approach a preferable color (preferable coordinates). In other words, the correction is made to narrow a color reproduction range.

As illustrated in FIG. 9B, the parallel direction is corrected to transfer all of the lattice points within the correction range in the same direction. The transfer direction is to connect the source coordinates designated by the user and the destination coordinates. In other words, because the correction of the parallel direction transfers all of the lattice points within the correction range in the same direction, the color reproduction range is not narrowed as compared with the correction of the compression direction.

The user designates the correction direction according to a purpose of the memory color correction. The coordinate calculation unit 127 calculates the transfer distance M (Mr, Mg, Mb) of each lattice point and the corrected coordinates DC(DCr, DCg, DCb) of each lattice point from the following formula for computation according to the designated correction direction.

The formula for computation of the compression direction is represented by the following Expression 30.

$$Mr=(Rt-Rd) \times ME, Mg=(Gt-Gd) \times ME, Mb=(Bt-Bd) \times ME \quad DCr=Rd+Mr, DCg=Gd+Mg, DCb=Bd+Mb \quad \text{(Ex. 30)}$$

The formula for computation of the parallel direction is represented by the following Expression 31.

$$Mr=(Rt-Ro) \times ME, Mg=(Gt-Go) \times ME, Mb=(Bt-Bo) \times ME \quad DCr=Rd+Mr, DCg=Gd+Mg, DCb=Bd+Mb \quad \text{(Ex. 31)}$$

The coordinate calculation unit 127 supplies the corrected coordinates DC of each lattice point within the correction range E to the table data memory unit 220. As a result, the table data memory unit 220 holds a lookup table for transforming the arbitrary lattice point D into the corresponding corrected coordinates DC.

Subsequently, the advantages of the image processing apparatus 1 according to this embodiment will be described. As described above, the user only designates the source coordinates and the destination coordinates in the color space. According to this designation, the correction range calculation unit 110 automatically calculates the correction range E, and the lattice point transfer distance calculation unit 120 calculates the destination coordinates of each lattice point within the correction range E, and reflects the destination coordinates on the transformation rule (three-dimensional lookup table in this embodiment). That is, even if the user does not have the knowledge and know-how related to the color transformation (correction) processing in the color space, the user can easily realize the color transformation processing (realize the memory color correction in the above-mentioned example).

Further, the user has no need to sequentially set the transformation rule. That is, the user has no need to sequentially set the respective table data in the lookup table to be subjected to the memory color correction. The user sets only the source coordinates and the destination coordinates. As a result, the man-hour for setting by the user can be reduced.

Further, the correction range calculation unit 110 according to this embodiment rotates the correction range E according to the positional relationship between the source coordinates and the destination coordinates (rotates on an RG-axis plane, rotates on a GB-axis plane) (FIG. 5). In more detail, the correction range calculation unit 110 rotates the correction range E so that a line connecting the source coordinates and the destination coordinates becomes a long-axis direction. With this operation, the memory color correction having no color space distortion can be conducted. The details will be described with reference to FIGS. 10A and 10B.

Figure 10A:
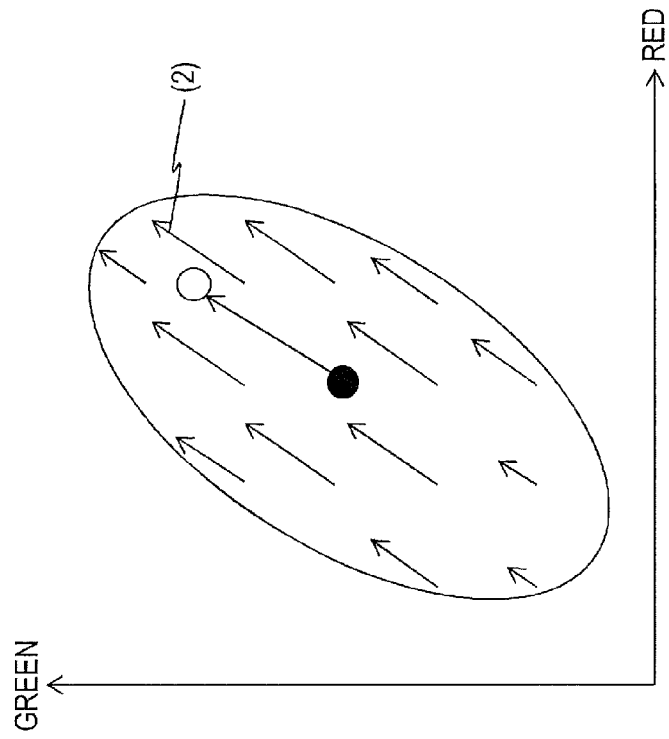
FIGS. 10A and 10B are conceptual diagrams illustrating the effect of rotation of the correction range.

FIG. 10A is a diagram illustrating a change in the coordinates in the color space when the correction range is not rotated. As illustrated in FIG. 10A, the transfer distance of each coordinates positioned in the vicinity of the destination coordinates is rapidly changed.

Figure 10B:
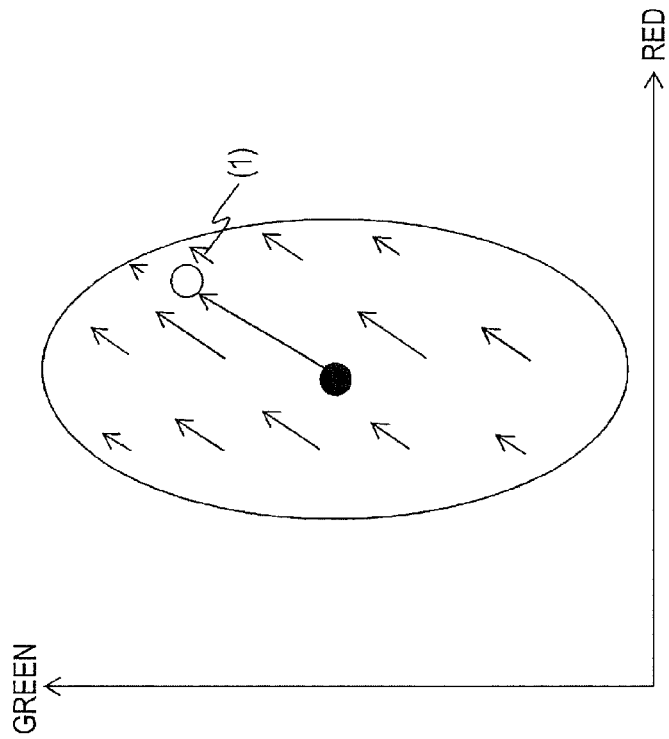

FIG. 10B is a diagram illustrating a change in the coordinates in the color space when the correction range is rotated (that is, the configuration of the image processing apparatus 1 according to this embodiment). As illustrated in FIG. 10B, the transfer distance of the lattice point coordinates (the magnitude of a transfer vector) is more gently changed as the source coordinates and the lattice point coordinates are farther from each other (for example, the amount of correction indicated by (2) in FIG. 10B is larger than the amount of correction indicated by (1) in FIG. 10A). This is because control is made so that the transfer distance of each coordinates within the correction range is gradually smaller as the distance to the source coordinates is larger. Because the color is not rapidly changed, the color space distortion can be avoided.

Further, according to image processing apparatus 1 of this embodiment, only the color to be corrected can be corrected. The advantages will be described with reference to FIGS. 11A and 11B.

Figure 11A:
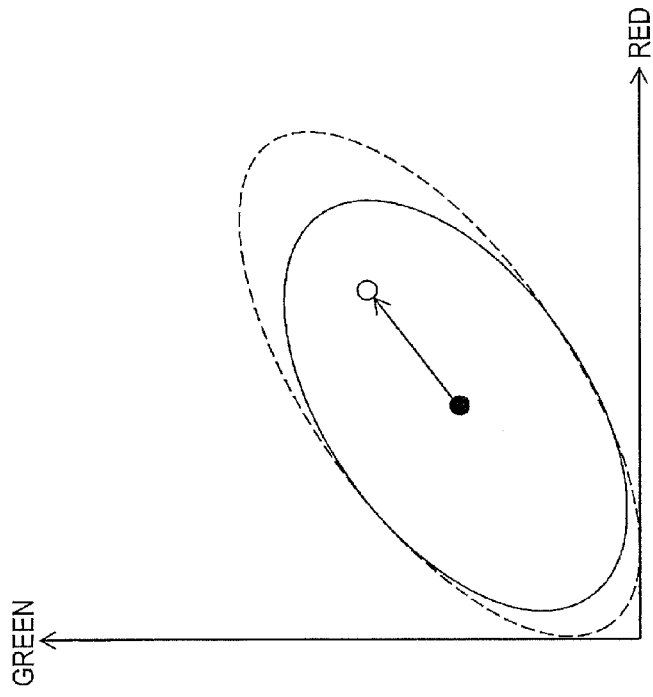
FIGS. 11A and 11B are conceptual diagrams illustrating a memory color correction of flesh color.
Figure 11B:
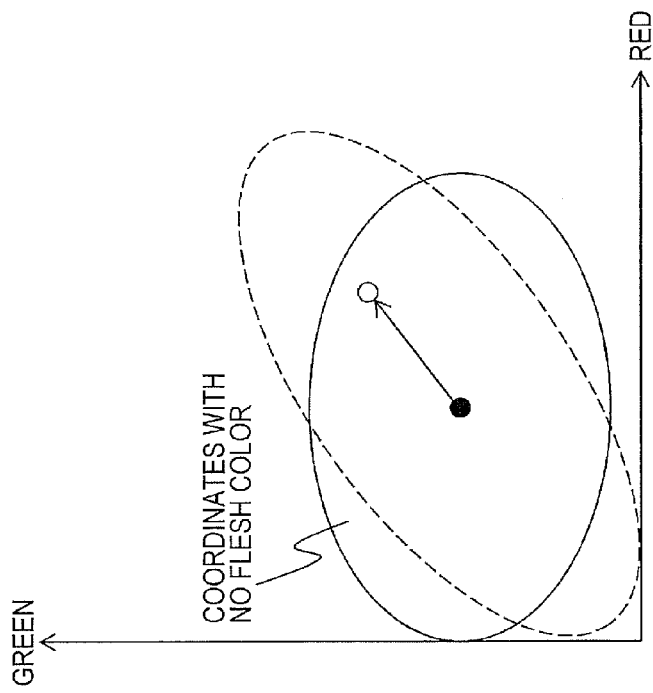

FIGS. 11A and 11B are conceptual diagrams illustrating the memory color correction of a flesh color. FIG. 11A is a diagram illustrating the correction range E when the correction range E is not rotated. When the correction range E is not rotated, the coordinates indicative of colors other than the color (flesh color) to be corrected are also to be unavoidably corrected. For that reason, the color not intended to be corrected by the user is unavoidably corrected (coordinates transfer in the color space).

On the other hand, FIG. 11B is a diagram illustrating the correction range E when the correction range E is rotated (that is, the configuration of the image processing apparatus 1 according to this embodiment). When the correction range E is rotated, only the coordinates representative of the color (flesh color) to be corrected are to be corrected. Further, the destination coordinates of each lattice point also fall within a range in which the flesh color exists. For that reason, the image processing apparatus 1 according to this embodiment can appropriately correct only the color to be corrected without correcting the colors not intended to be corrected.

As has been described with reference to FIGS. 10A, 10B, 11A, and 11B, the image processing apparatus 1 according to this embodiment has such an advantage that the correction quality is improved, in addition to the advantages that the correction processing is realized without know-how, and the man-hour is reduced. When the user manually conducts the setting, because the user focuses on the optimization of each setting item, the occurrence of final color space distortion may be induced. On the other hand, the image processing apparatus according to this embodiment determines the correction range E according to the relationship between the source coordinates and the destination coordinates. The transfer distance of the coordinates within the correction range E is controlled to be smaller as the distance to the source coordinates is larger. For that reason, the image processing apparatus can generate an appropriate image without any color space distortion as described above.

The lattice point transfer distance calculation unit 120 within the image processing apparatus 1 according to this embodiment includes the transfer characteristic setting unit 126. However, the present invention is not always limited to this configuration, but may calculate the transformation destination coordinates directly from the degree of influence Ef.

Second Embodiment

The image processing apparatus according to this embodiment is characterized in that the memory color correction taking a picture of each image (for example, each frame for moving pictures) into account can be realized. The image processing apparatus according to this embodiment will be described below.

Figure 12:
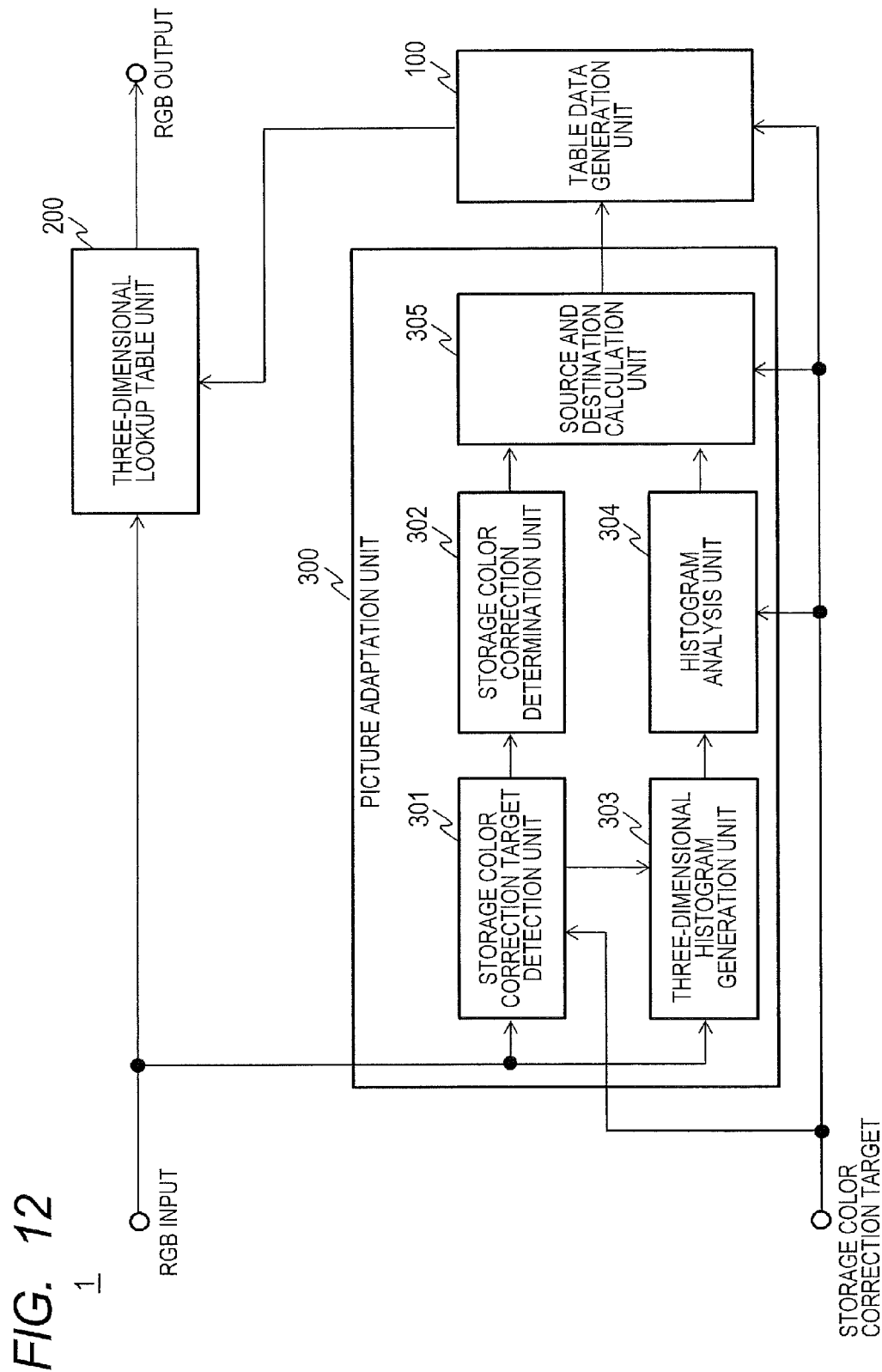
FIG. 12 is a block diagram illustrating a configuration of an image processing apparatus according to a second embodiment of the present invention.

FIG. 12 is a block diagram illustrating a configuration of the image processing apparatus according to this embodiment. The image processing apparatus 1 includes a picture adaptation unit 300 in addition to the table data generation unit 100 and the three-dimensional lookup table unit 200. The configurations and processing of the table data generation unit 100 and the three-dimensional lookup table unit 200 are identical with those in the first embodiment, and therefore the configuration and operation of the picture adaptation unit 300 will be described below.

The picture adaptation unit 300 includes a storage color correction target detection unit 301, a storage color correction determination unit 302, a three-dimensional histogram generation unit 303, a histogram analysis unit 304, and a source and destination calculation unit 305.

The storage color correction target detection unit 301 detects an object and a background to be subjected to the memory color correction within the image (in the following description, the object and the background are also collectively called "memory color correction target"). The memory color correction target includes, for example, a face, sky, a sea, red leaves, cherry blossoms, green of trees. The storage color correction target detection unit 301 detects and analyzes the shapes, colors, brightness, and positions within an image (for example, upper portion of a screen: sky, lower portion of the screen: sea), of those memory color correction targets. An image recognition technique generally used may be used for the detection processing. In recent years, the image recognition technique for detecting a specific memory color correction target has been developed widely in various fields. In particular, a large number of commercial products such as digital still cameras have a function of face detection or the like.

The storage color correction target detection unit 301 supplies the detected information (existence, shape, color, brightness, and position within the image, of the memory color correction target) to the storage color correction determination unit 302 and the three-dimensional histogram generation unit 303 with the use of the general detection technique for the memory color correction target.

The storage color correction determination unit 302 is a processing unit for determining whether the memory color correction is conducted, or not. The storage color correction determination unit 302 receives information on the memory color correction target intended to be corrected by the user. In this embodiment, the user designates the memory color correction target to be corrected. In this example, the user may designate a plurality of memory color correction targets. When designating the plurality of memory color correction targets, the user sets a preset value of the source coordinates and a preset value of the destination coordinates for each of the memory color correction targets. For example, when the memory color correction of blue sky and cherry blossoms is conducted at the same time, the user sets a preset value of the source coordinates and a preset value of the destination coordinates related to the blue sky, and a preset value of the source coordinates and a preset value of the destination coordinates related to the cherry blossoms.

The storage color correction determination unit 302 compares information (existence within the image, shape, color, brightness, and position within the image, of the memory color correction target) with the memory color correction target designated by the user to determine whether the memory color correction is conducted, or not.

If no memory color correction target designated by the user exists within the image, there is a possibility that no correct effect occurs even if the memory color correction is conducted. Further, there is a risk that an unintended memory color correction target may be subjected to the memory color correction. For those reasons, the storage color correction determination unit 302 determines whether the memory color correction is conducted, or not.

The storage color correction determination unit 302 conducts determination for each of the images (frames). However, in a system (to be described later) that holds a plurality of three-dimensional lookup tables or a system that can designate a correction area to be corrected by the three-dimensional lookup table, the storage color correction determination unit 302 may conduct the above-mentioned determination (determination of whether to conduct the memory color correction) for each of the areas in the screen. As a result, the memory color correction further excellent in the precision can be realized.

The storage color correction determination unit 302 supplies the determination results to the source and destination calculation unit 305.

The three-dimensional histogram generation unit 303 receives an RGB value of the entire input image as well as the information detected by the storage color correction target detection unit 301. The three-dimensional histogram generation unit 303 generates three-dimensional histograms of the entire screen and an image area in which the memory color correction target is detected. The three-dimensional histogram generation unit 303 supplies two kinds of generated three-dimensional histograms to the histogram analysis unit 304.

The histogram analysis unit 304 analyzes the two kinds of input three-dimensional histograms (the three-dimensional histogram of the image area in which the memory color correction target is detected, and the three-dimensional histograms of the entire image). First, a description will be given of the analysis of the three-dimensional histograms of the image area in which the memory color correction target is detected.

The same object or the same background is displayed in the image area in which the memory color correction target is detected. For example, pixels configuring the blue sky exist in an area where the blue sky is detected. For that reason, it is assumed that, in the histogram in the color space, values are concentrated on a given area within the three-dimensional space. In this example, in the histogram, color coordinates having a given frequency or lower are ignored. As a result, the histogram having an oval spherical shape centered on the color coordinates within the three-dimensional space can be obtained. The histogram analysis unit 304 detects coordinates of the center of the oval spherical shape, that is, coordinates of the main color of the memory color correction target as the analysis results. In the detection method, two kinds of oval sphere position center detection and oval sphere gravity center detection are mainly conceivable. First, the oval sphere position center detection will be described.

The histogram analysis unit 304 defines the maximum values, the minimum values, and center values of the respective axes of RGB within the oval sphere related to the above-mentioned histogram as follows, and calculates a center value of the oval sphere through the following expression.
Maximum values within the oval sphere: Rmax, Gmax, Bmax
Minimum values within the oval sphere: Rmin, Gmin, Bmin
Center values within the oval sphere: Rcen, Gcen, Bcen $$Rcen = \frac{(Rmax - Rmin)}{2},$$
$$Gcen = \frac{(Gmax - Gmin)}{2},$$
$$Bcen = \frac{(Bmax - Bmin)}{2}$$

(Ex. 32)

Subsequently, the oval sphere gravity center detection will be described. The histogram analysis unit 304 defines accumulated values and oval sphere gravity center values of the respective axes of RGB within the above-mentioned oval sphere as follows, and calculates a gravity center value of the oval sphere through the following Expression 33.
Accumulated values within the oval sphere: Rsgm, Gsgm, Bsgm
The total number of pixels: Dot
Gravity center values within the oval sphere: Rgra, Ggra, Bgra $$Rsgm = \sum_{n=1}^{Dot} Rn,$$
$$Gsgm = \sum_{n=1}^{Dot} Gn,$$
$$Bsgm = \sum_{n=1}^{Dot} Bn$$
$$Rgra = \frac{Rsgm}{Dot},$$
$$Ggra = \frac{Gsgm}{Dot},$$
$$Bgra = \frac{Bsgm}{Dot}$$

(Ex. 33)

The histogram analysis unit 304 may calculate the center/gravity center (that is, the coordinates of the main color of the object or background) of the oval sphere within the histogram through a method other than the above method. The histogram analysis unit 304 supplies the coordinates obtained by analysis to the source and destination calculation unit 305.

Subsequently, a description will be given of the analysis of the histogram of the entire image by the histogram analysis unit 304. The histogram analysis unit 304 analyzes how the histogram is shaped between the preset value of the source coordinates and the preset value of the destination coordinates which are set for each of the memory color correction targets by the user, and in the color coordinates of the periphery. In more detail, the histogram analysis unit 304 analyzes whether color has already existed in the vicinity of the preset value of the destination coordinates in a state before the memory color correction (whether a plurality of coordinates having the color similar to the color of the destination has exited). Also, the histogram analysis unit 304 analyzes a distribution rate of the colors between the preset value of the source coordinates and the preset value of the destination coordinates.

Figure 13:
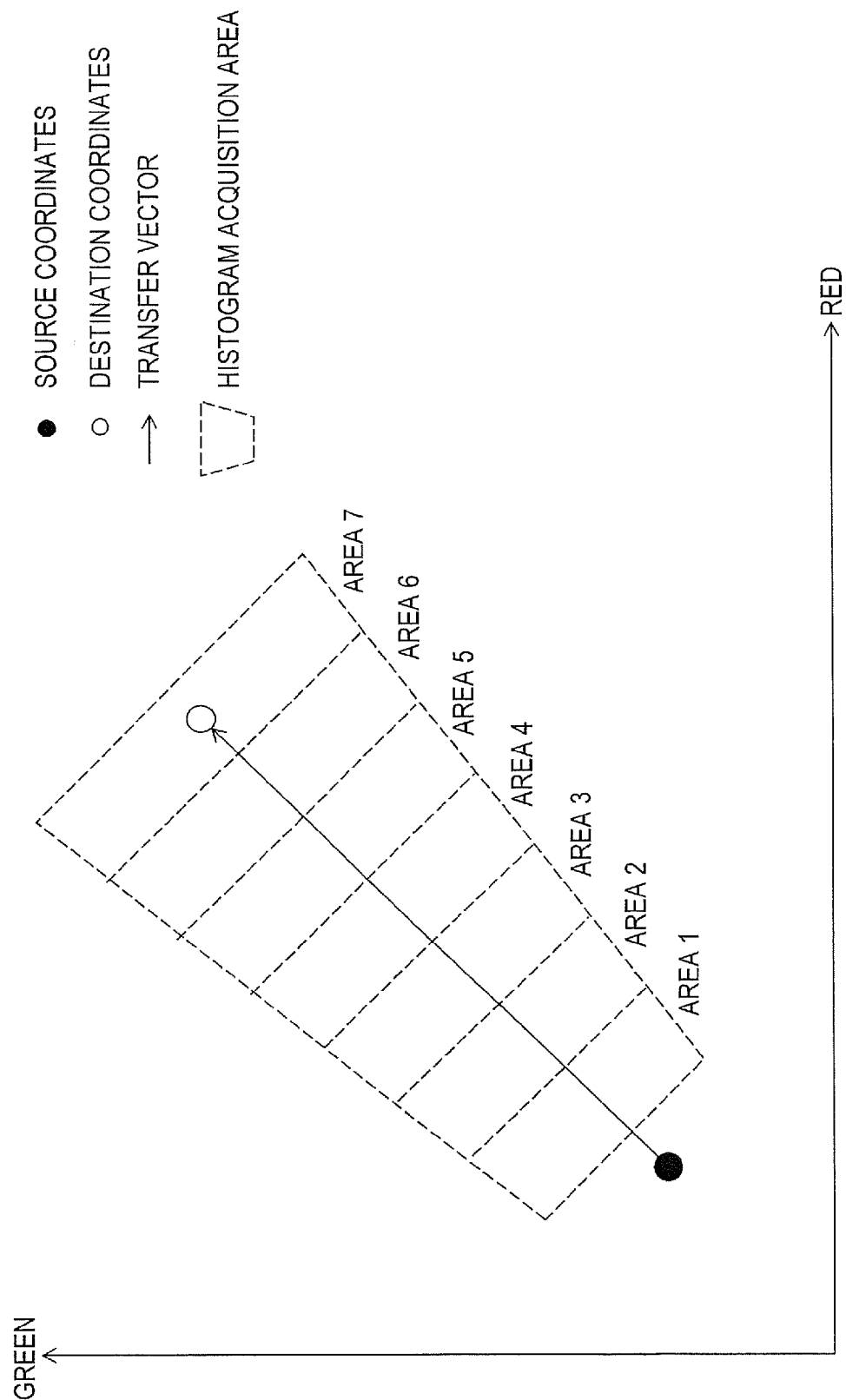
FIG. 13 is a diagram illustrating analysis of histogram of an overall image by a histogram analysis unit according to the second embodiment of the present invention.

A description will be given in detail of the analysis of the histogram of the entire image by the histogram analysis unit 304 with reference to FIG. 13. In FIG. 13, seven areas are set between a preset value OP of the source coordinates and a preset value TP of the destination coordinates. In FIG. 13, for convenience of description, two-dimensional coordinate space is illustrated. However, the histogram analysis unit 304 really deals with the three-dimensional coordinate space.

The histogram analysis unit 304 analyzes the histogram for each of the seven areas. The histogram analysis unit 304 determines whether the number of pixels located in each of the areas exceeds a given threshold value, or not. If exceeding, the histogram analysis unit 304 determines that color exists in the above area before correction (a given number of pixels or more exist in the above area before correction). The determination is conducted in the order from an area 1 closer to the preset value of the source coordinates to an area 7. The histogram analysis unit 304 completes the determination processing when detecting the area in which the given number of pixels or more can be confirmed. The histogram analysis unit 304 detects representative coordinates of the area in which the given number of pixels or more can be confirmed as existing coordinates TE(TEr, TEg, TEb). The histogram analysis unit 304 supplies the existing coordinates TE(TEr, TEg, TEb) to the source and destination calculation unit 305.

For example, if the given number of pixels or more do not exist in the area 1, and the given number of pixels or more exist in the area 2, the histogram analysis unit 304 does not conduct the determination related to the area 3 and subsequent areas. Then, the histogram analysis unit 304 detects the representative coordinates of the area 2 as the existing coordinates TE(TEr, TEg, TEb). The determination to the area 7 is determined, and if there is no area in which the given number of pixels or more exist, the histogram analysis unit 304 considers that there exists no existing coordinates TE.

In the description of FIG. 13, seven areas are provided in the histogram, but the present invention is not always limited to this configuration. If the number of areas is increased more, the histogram analysis unit 304 can detect the existing coordinates in detail. That is, a precision in the existence determination can be improved. As a result, the setting precision in the destination coordinates of the memory color correction which will be described later can be improved.

Subsequently, the source and destination calculation unit 305 will be described. In this embodiment, the user sets the preset value OP of the source coordinates O and the preset value TP of the destination coordinates T for each object or background to be corrected. The source and destination calculation unit 305 calculates the source coordinates O and the destination coordinates T to be supplied to the table data generation unit 100 on the basis of the preset values, the determination results of the storage color correction determination unit 302, and the analysis results of the histogram analysis unit 304. That is, in this embodiment, the source coordinates and the destination coordinates which are input by the user are not used as they are, but the coordinate position is adjusted and supplied to the table data generation unit 100.

First, a description will be given of calculation processing of the source coordinates O by the source and destination calculation unit 305. The user sets the preset value OP(OPr, OPg, ORb) of the source coordinates for each of the memory color correction targets. The source and destination calculation unit 305 receives the analysis results of the histogram analysis unit 304. The analysis results are center color coordinates OC(OCr, OCg, OCb) of the memory color correction target designated by the user. The source and destination calculation unit 305 calculates the source coordinates O(Ro, Go, Bo) between the preset value OP(OPr, OPg, ORb) and the center color coordinates OC(OCr, OCg, OCb) through Expression 34 which will be described later. The user can set a following degree F1 (0 to 100%) which is an index of how much the preset value of the source coordinates can approach the center color coordinates OC(OCr, OCg, OCb). If the following degree F1 is set to 0%, the source coordinates O are equal to the preset value OP(OPr, OPg, ORb) of the source coordinates O. If the following degree F1 is set to 100%, the source coordinates O are equal to the center color coordinates OC(OCr, OCg, OCb). If the following degree F1 is set to 50%, the source coordinates O are an intermediate value between the preset value OP(OPr, OPg, ORb) of the source coordinates O and the center color coordinates OC(OCr, OCg, OCb). A formula for computation (Ex. 34) of the source coordinates O(Ro, Go, Bo) is represented as follows.

$$Ro=OPr+(OCr-OPr)\times F1$$

$$Go=OPg+(OCg-OPg)\times F1$$

$$Bo=OPb+(OCb-OPb)\times F1 \quad (\text{Ex. 34})$$

It is assumed that the following degree F1 is set to about 50%, and a default value when the user does not designate the following degree F1 is also set to about 50%.

Subsequently, a description will be given of the calculation processing of the destination coordinates by the source and destination calculation unit 305. The user sets the preset value TP(TPr, TPg, TRb) of the source coordinates for each of the memory color correction targets. The source and destination calculation unit 305 receives the analysis results of the histogram analysis unit 304, and determines whether a given number of pixels or more have already existed in a direction the destination in a state before correction, or not. If existing, the source and destination calculation unit 305 calculates final destination coordinates T on the basis of the input existing coordinates TE(TEr, TEg, TEb) and the preset value TP(TPr, TPg, TRb) of the destination coordinates T through Expression 35 that will be described later. The user can set a following degree F2 (0 to 100%) which is an index of how much the preset value of the destination coordinates T can approach the existing coordinates TE. If the following degree F2 is set to 0%, the destination coordinates T are equal to the preset value TP(TPr, TPg, TRb) of the destination coordinates T. If the following degree F2 is set to 100%, the destination coordinates T are equal to the existing coordinates TE(TEr, TEg, TEb). If the following degree F2 is set to 50%, the destination coordinates T are an intermediate value between the preset value TP(TPr, TPg, TRb) of the destination coordinates T and the existing coordinates TE(TEr, TEg, TEb). A formula for computation (Ex. 35) of the destination coordinates T(Rt, Gt, Et) is represented as follows.

$$Rt=TPr+(TEr-TPr)\times F2$$

$$Gt=TPg+(TEg-TEg)\times F2$$

$$Rt=TPr+(TEb-TPb)\times F2 \quad (\text{Ex. 35})$$

It is assumed that the following degree F2 is set to about 50%, and a default value when the user does not designate the following degree F2 is also set to about 50%.

The source and destination calculation unit 305 supplies the calculated source coordinates O(Ro, Go, Bo) and the destination coordinates T(Rt, Gt, Bt) to the table data generation unit 100.

Subsequently, a description will be given of problems on the memory color correction not taking the picture into account, and the advantages of the image processing apparatus 1 according to this embodiment. First, the problems on the memory color correction not taking the picture into account will be described.

In the memory color correction not taking the picture into account, the correction processing is conducted with the aid of the lookup table to which one steady pattern has been input regardless of the presence or absence of the memory color correction target. For that reason, there is a risk that the pixels of the unintentional memory color correction target unintended to be corrected are unavoidably corrected.

Further, even if the memory color correction target intended to be corrected by the user exists within the image, because the memory color correction target (for example, a person's face) has a color different from a color area assumed as the memory color correction target, there is a risk that the pixels to be corrected cannot be sufficiently included within the correction range.

Figure 14:
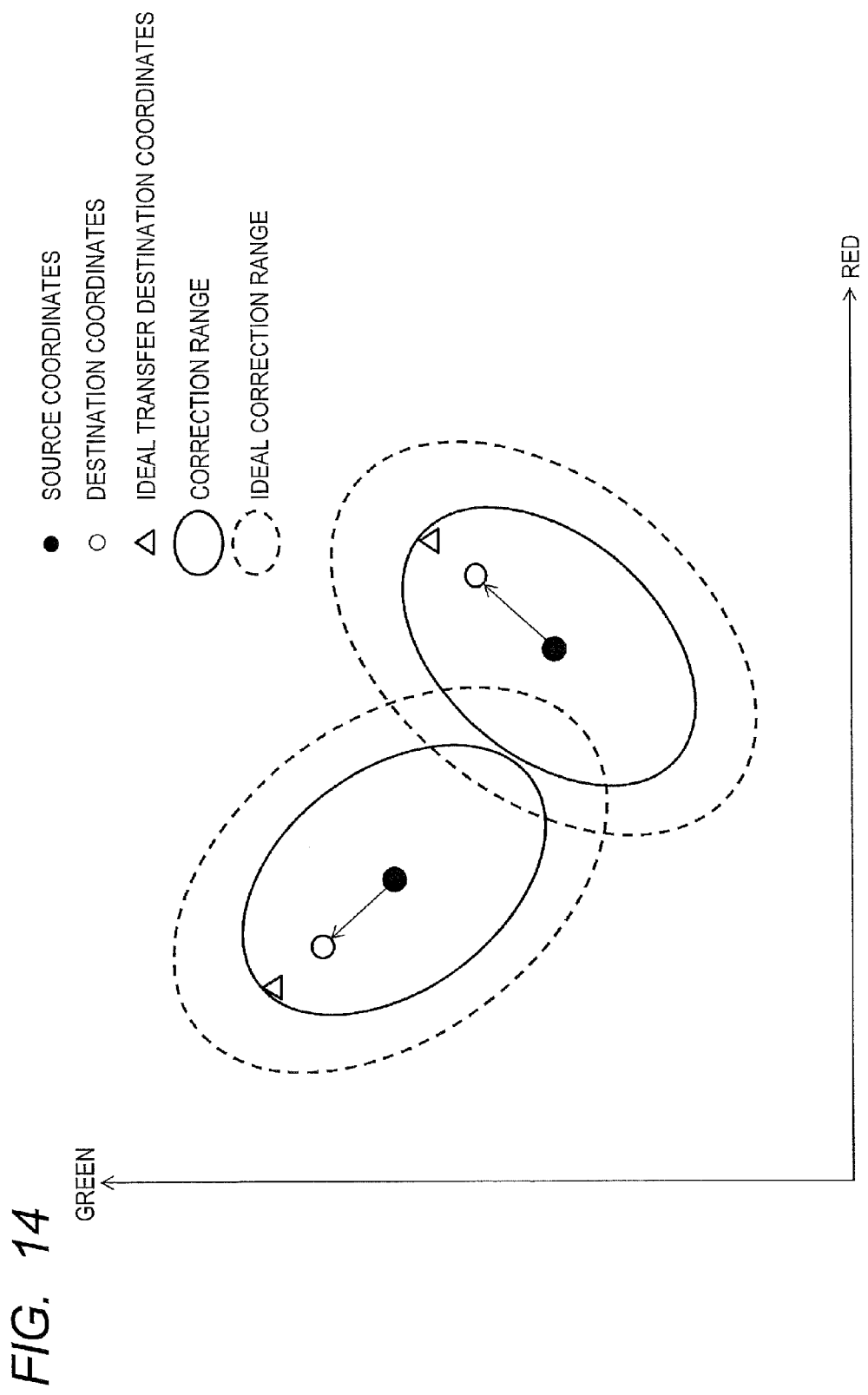
FIG. 14 is a conceptual diagram illustrating an interference of the correction range.

In the memory color correction using the lookup table, the correction is frequently conducted on a plurality of memory color correction targets at the same time. In this case, the correction ranges may interfere with each other. The status will be described with reference to FIG. 14. As illustrated in FIG. 14, the correction range related to one memory color correction target may interfere with the correction range related to another memory color correction target. In this case, it is unclear how the correction is conducted within the interfering areas. For that reason, there is a need to conduct processing while suppressing a correction intensity more than a generally ideal amount of correction. That is, the correction processing is conducted after the correction range is reduced as illustrated in FIG. 14. For that reason, a sufficient correction effect can be obtained.

Subsequently, a description will be given of the advantages of the image processing apparatus 1 according to this embodiment. The image processing apparatus 1 according to this embodiment detects the memory color correction target, and automatically calculates the source coordinates and the destination coordinates on the basis of the histograms of the memory color correction target and the entire image. As a result, the image processing apparatus 1 according to the first embodiment can obtain the following two advantages.

(1) The correction processing can be conducted on only the memory color correction target intended to be corrected by the user.

(2) The correction with a sufficient intensity can be conducted on the memory color correction target intended to be corrected by the user.

First, a description will be given of a reason why there can be obtained the advantage that "the correction processing can be conducted on only the memory color correction target intended to be corrected by the user" in the image processing apparatus 1 according to this embodiment.

The storage color correction determination unit 302 calculates whether there is the memory color correction target designated by the user, or not. Only when there is the memory color correction target designated by the user, the source and destination calculation unit 305 calculates the source coordinates and the destination coordinates T. As a result, the image processing apparatus 1 (three-dimensional lookup table unit 200) can conduct only the memory color correction related to the memory color correction target, that is, obtain the above-mentioned advantage (1).

If a plurality of memory color correction targets do not exist within one screen, that is, if only one memory color correction target exists, the image processing apparatus 1 conducts the memory color correction on the single memory color correction target. For that reason, the image processing apparatus 1 has no need to cope with the interference of the correction ranges.

The storage color correction determination unit 302 determines that there are the plurality of memory color correction targets designated by the user, and if both of the correction ranges interfere with each other, the image processing apparatus 1 could conduct unintended transformation on the color coordinates belonging to the interference area. However, this problem is solved by a configuration of a fourth or fifth embodiment which will be described later.

Subsequently, a description will be given of reasons why there can be obtained the advantage that "(2) The correction with a sufficient intensity can be conducted on the memory color correction target intended to be corrected by the user." in the image processing apparatus 1 according to this embodiment. The following two reasons will be described.

A first reason will be described below. As described above, the storage color correction determination unit 302 calculates whether there is the memory color correction target designated by the user, or not. Then, the source and destination calculation unit 305 sets the correction range for only the memory color correction target designated by the user and detected. That is, for example, in FIG. 14, the correction range can be limited to only the memory color correction target designated by the user. For that reason, the number of oval spheres indicative of the correction ranges in the color space can be reduced. As a result, a need to taking the interference of the correction ranges of the memory color correction into account is reduced, and a need to take action such as a reduction in the correction range can be reduced. Because a need to reduce the correction range is reduced, the correction with a sufficient intensity can be conducted.

Figure 15A:
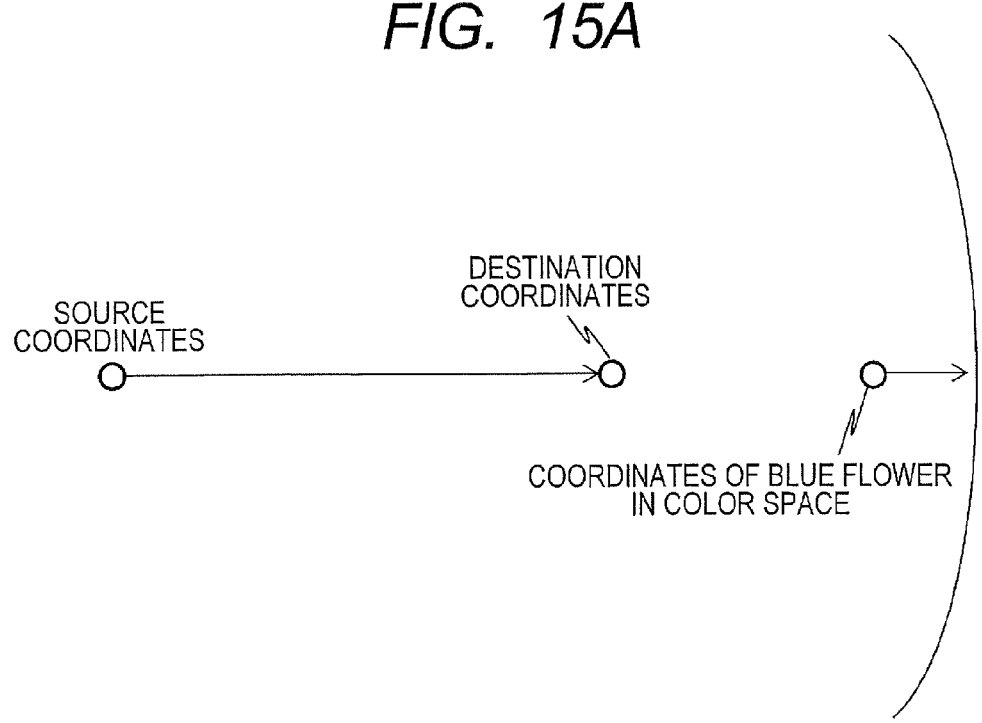
FIGS. 15A and 15B are conceptual diagrams illustrating memory color corrections in the image processing apparatus according to the first and second embodiments of the present invention.
Figure 15B:
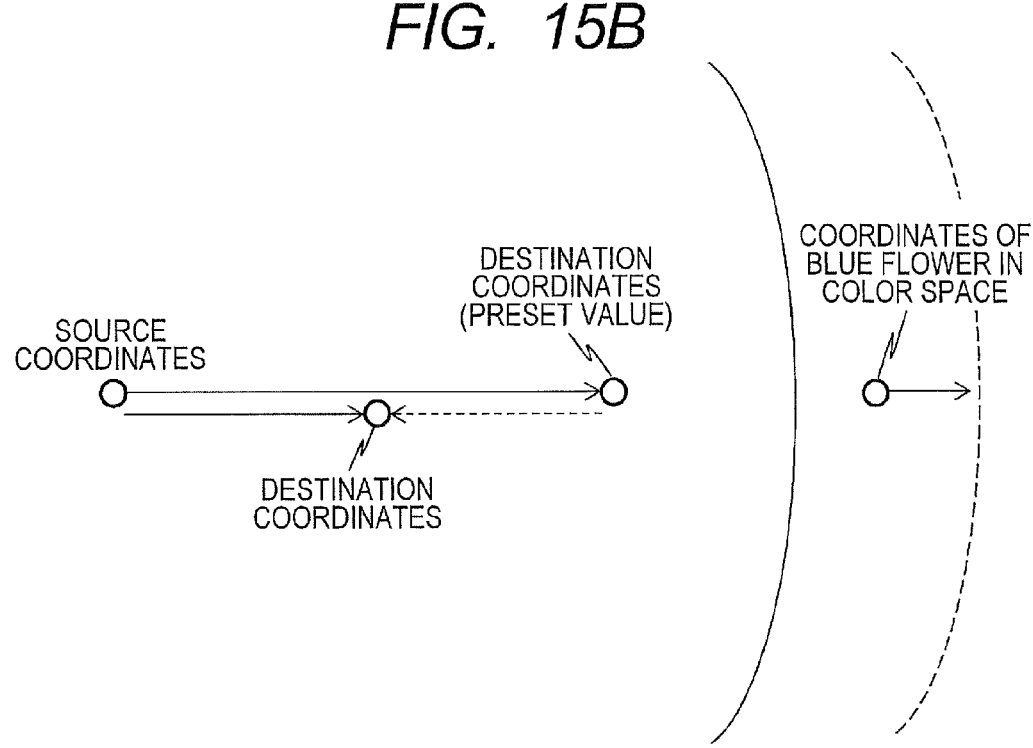

Subsequently, a second reason why the above-mentioned advantage (2) is obtained will be described with reference to FIGS. 15A and 15B. In the description of FIGS. 15A and 15B, it is assumed that there are an area indicative of blue sky and an area indicative of a blue flower in an image to be processed. It is assumed that the user intends to conduct only the memory color correction of blue sky.

FIG. 15A is a conceptual diagram illustrating the memory color correction by the image processing apparatus 1 according to the first embodiment. In this case, the image processing apparatus 1 determines the correction range with the use of the source coordinates and the destination coordinates, which are input by the user, as they are. For that reason, if the objects having similar colors such as the blue sky and the blue flower exist within the image, the image processing apparatus 1 unintentionally changes the color of the blue flower unintended to be corrected.

FIG. 15B is a conceptual diagram illustrating the memory color correction by the image processing apparatus 1 according to this embodiment. The histogram analysis unit 304 determines whether a given number of pixels or more exist between the preset value of the source coordinates and the preset value of the destination coordinates, or not. If the given number of pixels or more do not exist, the source and destination calculation unit 305 sets the preset value of the source coordinates as the source coordinates as it is, and sets the preset value of the destination coordinates as the destination coordinates as it is. As a result, the image processing apparatus 1 can conduct the memory color correction with the sufficient intensity.

On the other hand, if the given number of pixels or more exist, the source and destination calculation unit 305 transfers the preset value (coordinates) of the destination coordinates in a direction closer to the preset value of the source coordinates, and determines the transfer point as the destination coordinates. For example, if the blue sky and the blue flower are displayed within the image, the image processing apparatus 1 moves the preset value of the destination coordinates closer to the preset value of the source coordinates, and conducts the memory color correction (refer to FIG. 15B). In this example, the source and destination calculation unit 305 appropriately adjusts the transfer distance of the preset value (coordinates) according to an area in which the given number of pixels or more exists. As a result, as illustrated in FIG. 15B, the image processing apparatus 1 can conduct the memory color correction of the object (background) to be corrected while automatically calculating a range in which the object (background) not to be corrected is not affected.

As described above, the general image processing apparatus reduces the correction range of the memory color correction without any exception taking adverse effects on the other objects (background) into account. However, the image processing apparatus 1 according to this embodiment analyzes an existence position of the color within the color space (conducts the above-mentioned histogram analysis) to detect a possibility that another object not intended to be corrected exists with the result that an optimum correction range can be determined for each of the frames (images). With the above configuration, the image processing apparatus 1 according to this embodiment can realize the memory color correction having the sufficient amount of correction according to the picture of the image (frame).

In a moving image, the picture is changed with time. The image processing apparatus 1 according to this embodiment appropriately adjusts the source coordinates and the destination coordinates used for the memory color correction in compliance with a change in the picture. For that reason, the image processing apparatus 1 according to this embodiment can realize the memory color correction with high precision with respect to the moving image.

In the above description, the picture adaptation unit 300 adjusts the preset value of the source coordinates and the preset value of the destination coordinates. However, the present invention is not always limited to this configuration, but the picture adaptation unit 300 may adjust any one of those preset values. For example, the picture adaptation unit 300 adjusts only the preset value of the source coordinates, and applies the destination coordinates input by the user as they are. Even with the above configuration, the image processing apparatus 1 can obtain specific advantages.

Third Embodiment

An image processing apparatus according to this embodiment is characterized in that the number of table data items held in the three-dimensional lookup table can be limited. It is assumed that the image processing apparatus according to this embodiment mainly conducts dynamic processing on the moving image (processing for analyzing the picture and conducting the memory color correction according to the picture). The image processing apparatus according to this embodiment is a modification of the second embodiment, and therefore differences (configuration and operation of the correction range calculation unit 110) from the second embodiment will be mainly described.

FIG. 16 is a block diagram illustrating a configuration of the correction range calculation unit 110 according to this embodiment. The correction range calculation unit 110 includes a transformed coordinate number limit unit 116 in addition to the configuration of FIG. 3.

The user sets a table data limit number set for the three-dimensional lookup table to the transformed coordinate number limit unit 116. In this example, the table data limit number means an upper limit number of the lattice points set as transformation targets for the three-dimensional lookup table. For example, the user may set the table data limit number taking into account the type of moving image data to be subjected to the memory color correction, the image data size (the number of pixels in a matrix) of the moving image data, and a required operation speed.

Figure 17A:
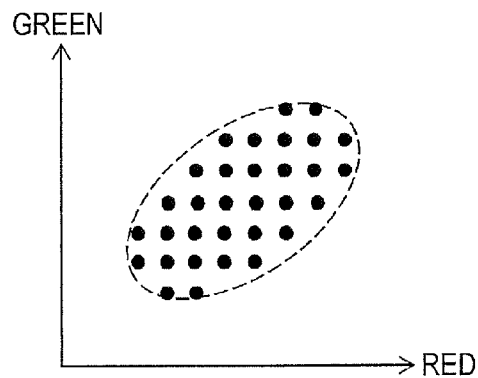
FIGS. 17A and 17B are diagrams illustrating a concept of resetting for calculating the number of lattice points included in the correction range, and reducing an oval sphere.

The transformed coordinate number limit unit 116 receives an oval sphere expression of each memory color correction target which is calculated by the correction range oval sphere expression calculation unit 115. For example, when the memory color correction of the blue sky and the memory color correction of the cherry blossoms are conducted, two oval sphere expressions are input to the transformed coordinate number limit unit 116. The transformed coordinate number limit unit 116 calculates a total number of lattice points to be corrected on the basis of those oval sphere expressions. The number of lattice points included within the oval spheres can be calculated from those oval sphere expressions on the basis of the lattice point distances (FIG. 17A). In this example, the transformed coordinate number limit unit 116 calculates the total number of lattice points to be corrected on the basis of all of the oval sphere expressions to be corrected. The transformed coordinate number limit unit 116 compares the table data limit number input from the user with the total number of lattice points to be corrected which are calculated on the basis of the oval sphere expressions.

If the table data limit number is equal to or larger than the total number of lattice points to be corrected, the transformed coordinate number limit unit 116 instructs the correction range oval sphere expression calculation unit 115 on an output of the oval sphere expressions.

On the other hand, if the table data limit number is smaller than the total number of lattice points to be corrected, the transformed coordinate number limit unit 116 instructs the correction range gain and offset adjustment unit 112 to readjust a gain and/or an offset. In this example, the transformed coordinate number limit unit 116 notifies the correction range gain and offset adjustment unit 112 of a ratio of the table data limit number to the total number of lattice points to be corrected. Then, the transformed coordinate number limit unit 116 instructs the correction range oval sphere expression calculation unit 115 to prohibit the output of the oval sphere expressions.

Figure 17B:
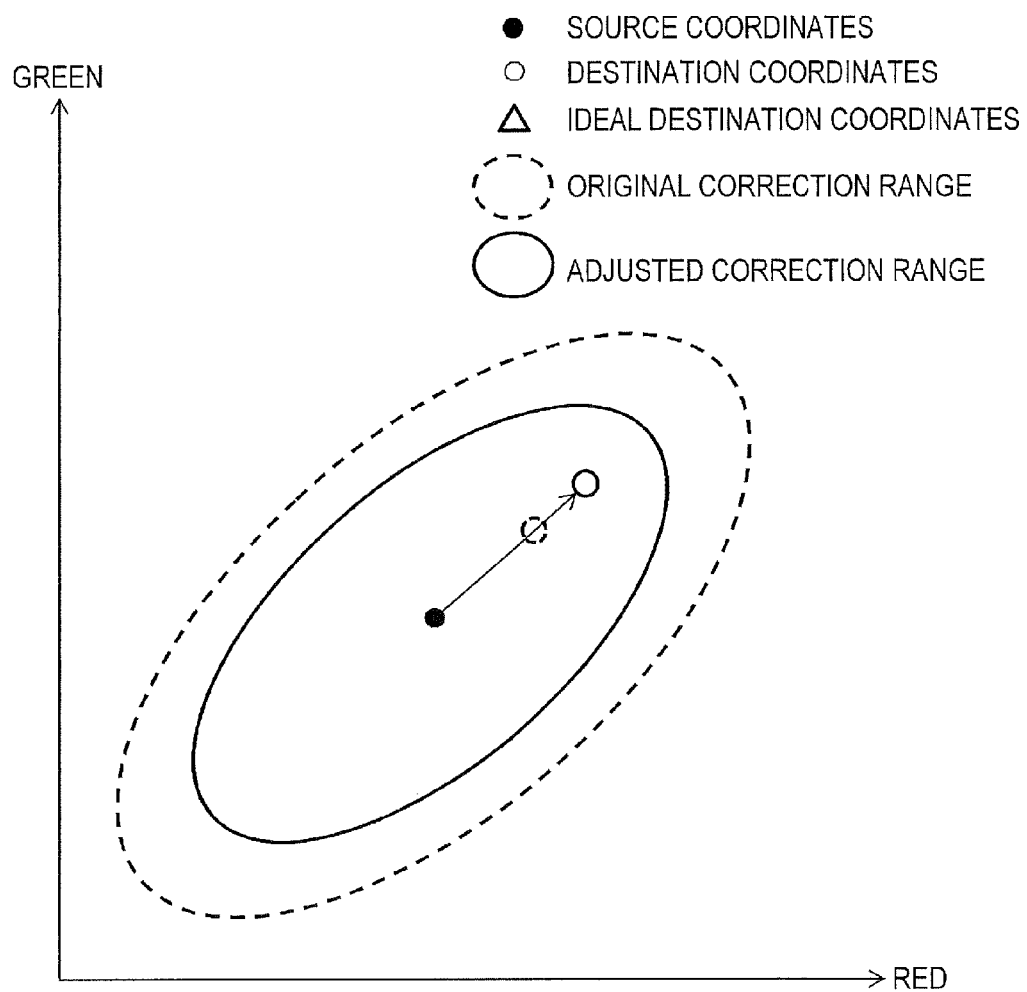

The correction range gain and offset adjustment unit 112 resets the gain and/or the offset so as to decrease the oval spheres with reference to the notified ratio (FIG. 17B). Because of resetting the gain and/or the offset with reference to the ratio, the correction range gain and offset adjustment unit 112 can avoid the oval sphere from being more downsized than necessary.

After resetting the gain and/or the offset, the correction range oval sphere expression calculation unit 115 again calculates the oval sphere expression.

In the above-mentioned description, the correction range is reduced by adjusting the gain and/or the offset. However, the present invention is not always limited to this configuration. For example, the source coordinates and/or the destination coordinates to be subjected to the memory color correction may transfer to reduce the correction range. For example, in the example of FIG. 17B, the destination coordinates is allowed to transfer to a position indicated by a dotted line to reduce the correction range of the memory color correction target. This is achieved by allowing the transformed coordinate number limit unit 116 to instruct the picture adaptation unit 300 to change the positions of the source coordinates and/or the destination coordinates to be subjected to the memory color correction.

Subsequently, a description will be given of the advantages of the image processing apparatus according to this embodiment. A general problem on the dynamic processing using the three-dimensional lookup table resides in that a large number of table data is set. Because the number of table data items is large, it is difficult to use the three-dimensional lookup table in processing of the moving image data where data is sequentially input.

The image processing apparatus according to this embodiment limits the number of table data items to be equal to or smaller than the table data limit number input by the user. That is, the image processing apparatus 1 according to this embodiment limits the number of table data items stored in the lookup table of the table size such as 729 (9×9×9) or 4913 (17×17×17) to the table data limit number or lower. For example, the image processing apparatus 1 limits the number of table data items stored in the lookup table having a capacity of 729 (9×9×9) to 200. As a result, the number of data items to be transferred within a unit time can be prevented from being increased, and the high processing speed of the entire system can be realized.

In the above-mentioned description, the number of data items stored in the three-dimensional lookup table is reduced by downsizing the oval sphere. However, the present invention is not always limited to this configuration. For example, the correction range oval sphere expression calculation unit 115 may reduce the number of memory color correction targets to be processed to reduce the number of data items.

Fourth Embodiment

Figure 18:
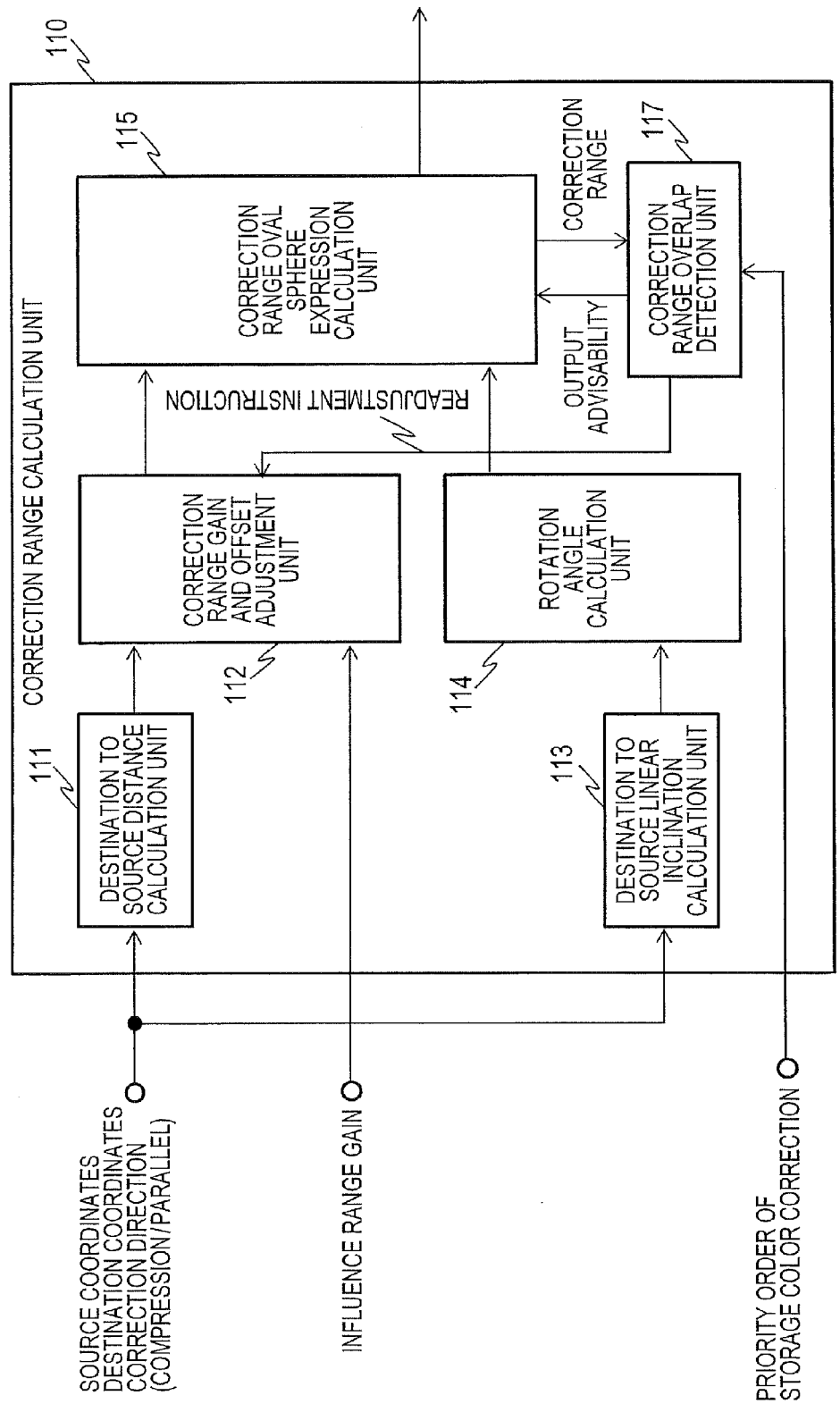
FIG. 18 is a block diagram illustrating a configuration of a correction range calculation unit according to a fourth embodiment of the present invention.

An image processing apparatus according to this embodiment conducts the memory color correction taking the priority order into account if there are a plurality of memory color correction targets. As described above, in the memory color correction using one three-dimensional lookup table, the color areas may interfere with each other. As a result, the memory color correction to the plurality of targets cannot be executed at the same time. Also, sufficient correction may not be conducted. In this embodiment, the user sets the priority order of the memory color correction for each of the objects or the background for the image processing apparatus. The image processing apparatus according to this embodiment conducts an optimum memory color correction according to the priority order even if the plurality of objects are subjected to the memory color correction. Hereinafter, the configuration of the image processing apparatus according to this embodiment will be described with reference to FIG. 18. Further, an operation image according to this embodiment will be described appropriately with reference to FIG. 19.

The correction range calculation unit 110 includes a correction range overlap detection unit 117 in addition to the configuration of FIG. 3. The priority order (the priority order is higher as numerical values are smaller) of the memory color correction targets is supplied to the correction range overlap detection unit 117. The user sets the priority order. For example, the user enters "priority order 1: blue sky", "priority order 2: blue flower", and "priority order 3: cherry blossoms".

The oval sphere expressions of the respective memory color correction targets, which are calculated by the correction range oval sphere expression calculation unit 115, are input to the correction range overlap detection unit 117. The correction range overlap detection unit 117 determines whether there is an overlap portion in the oval sphere, or not, if there are a plurality of oval sphere expressions. For example, in an example of FIG. 19, the overlap portion exists between an oval sphere of the memory color correction related to the object of the priority order 1, and an oval sphere of the memory color correction related to the object of the priority order 2. The correction range overlap detection unit 117 can determine whether there is the overlap portion, or not, through known processing in the three-dimensional space from the given oval sphere expression.

If there is the overlap portion, the correction range overlap detection unit 117 notifies the correction range gain and offset adjustment unit 112 of the memory color correction target lower in the priority order and a size of an overlap range. Then, the correction range overlap detection unit 117 instructs the correction range oval sphere expression calculation unit 115 to prohibit the output of the oval sphere expression.

If there is no overlap portion, the correction range overlap detection unit 117 instructs the correction range oval sphere expression calculation unit 115 to output the oval sphere expression.

Upon receiving a notice from the correction range overlap detection unit 117, the correction range gain and offset adjustment unit 112 adjusts the gain or/and the offset so that the oval sphere of the memory color correction target lower in the priority order becomes smaller. In this example, the correction range gain and offset adjustment unit 112 adjusts the gain or/and the offset according to the size of the overlap range. Then, the correction range gain and offset adjustment unit 112 supplies the correction range calculated after adjustment for each of RGB to the correction range oval sphere expression calculation unit 115.

Figure 19:
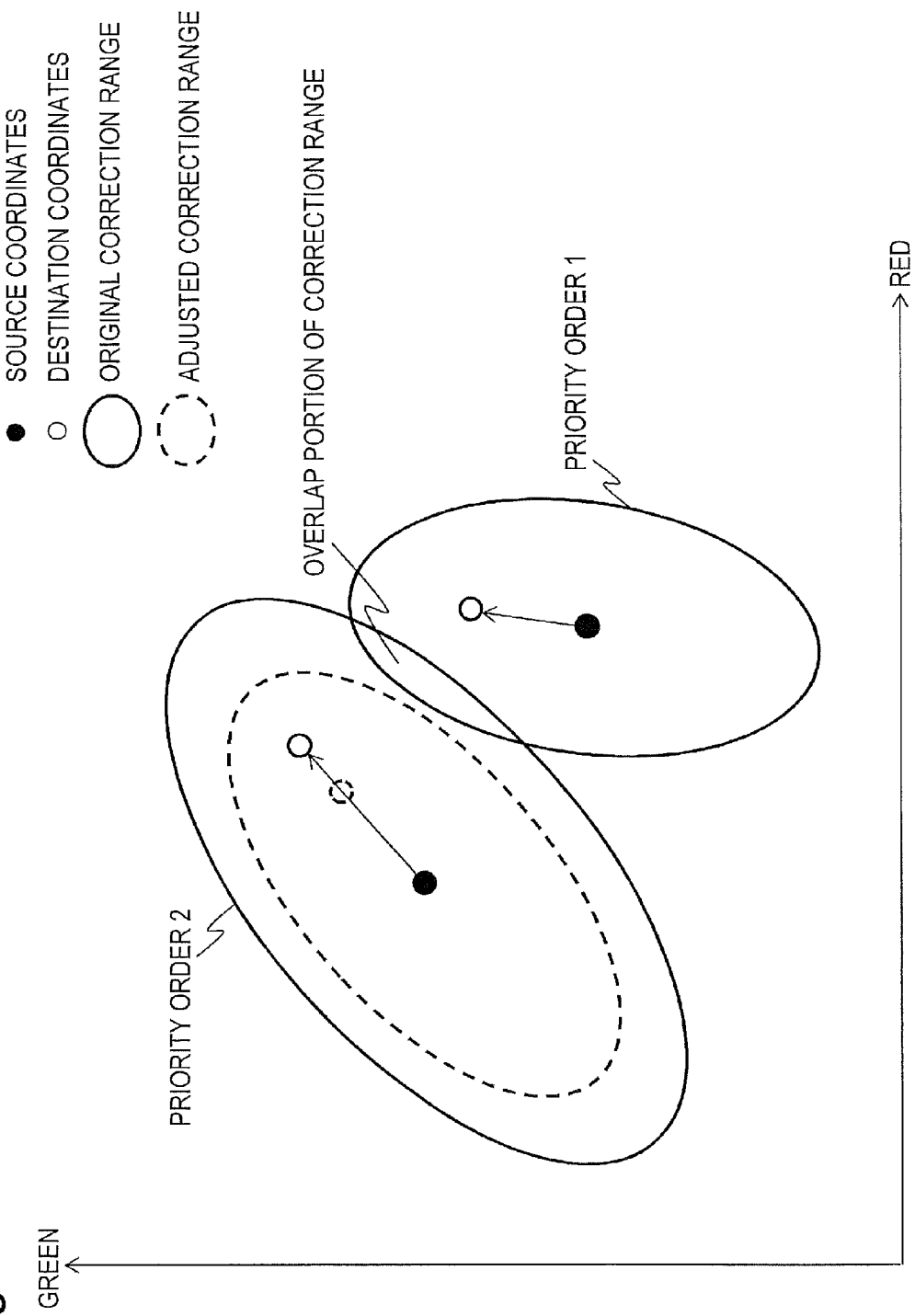
FIG. 19 is a conceptual diagram illustrating an operation image of an image processing apparatus according to the fourth embodiment of the present invention.

In the example of FIG. 19, the correction range gain and offset adjustment unit 112 changes the correction range of the priority order 2 (correction range lower in the priority order) to a correction range indicated by a dotted line by adjustment of the gain and/or the offset, and supplies the changed correction range to the correction range oval sphere expression calculation unit 115.

If there is the overlap portion, the memory color correction may not be conducted on the memory color correction target lower in the priority order.

Subsequently, the advantages of the image processing apparatus according to this embodiment will be described. First, a problem on the memory color correction not taking the priority order into account will be described. As illustrated in FIG. 19, if a plurality of memory color correction targets are dealt with, the correction ranges may overlap with each other. In this case, there is a need to take action for giving up correction of one memory color correction target, or the like. For that reason, the intended memory color correction effect may not be obtained.

On the other hand, the image processing apparatus according to this embodiment can set the priority order of the memory color correction targets if there are a plurality of memory color correction targets. Then, the image processing apparatus according to this embodiment can secure that the memory color correction with a desired intensity is surely conducted on the memory color correction target higher in the priority order. Further, if the correction ranges do not overlap with each other, the image processing apparatus according to this embodiment can conduct the memory color correction with the sufficient correction intensity even on the memory color correction target lower in the priority order.

Further, if the correction ranges overlap with each other, the correction range gain and offset adjustment unit 112 adjusts the gain and/or the offset to the degree that eliminates the overlap. For that reason, even if the correction ranges overlap with each other, the image processing apparatus according to this embodiment can conduct a given memory color correction on the memory color correction target lower in the priority order.

That is, according to the image processing apparatus of this embodiment, the memory color correction can be executed on a plurality of memory color correction targets belonging to the same (approximate) color area according to the user's intention.

Further, the configuration according to the third embodiment and the configuration according to the fourth embodiment can be combined together. That is, the image processing apparatus 1 may adjust the correction range to be narrowed according to the priority order so that the number of table data items becomes equal to or smaller than the table data limit number. In this case, even if the correction ranges do not overlap with each other, the correction ranges are reduced. This concept will be described below.

First, the correction range calculation unit 110 calculates the correction ranges (oval sphere expressions) of the respective memory color correction targets without taking the table data limit number into account. In this case, it is assumed that the number of table data items to be set for each of the frames exceeds the table data limit number (exceeds the capability of the system). However, if the user determines the priority order of the respective memory color correction targets in advance, the image processing apparatus 1 adjusts the respective correction ranges in such a manner that the reduction ratio of the correction range becomes higher as the priority order is lower so that the number of table data items becomes equal to or smaller than the table data limit number.

Figure 20A:
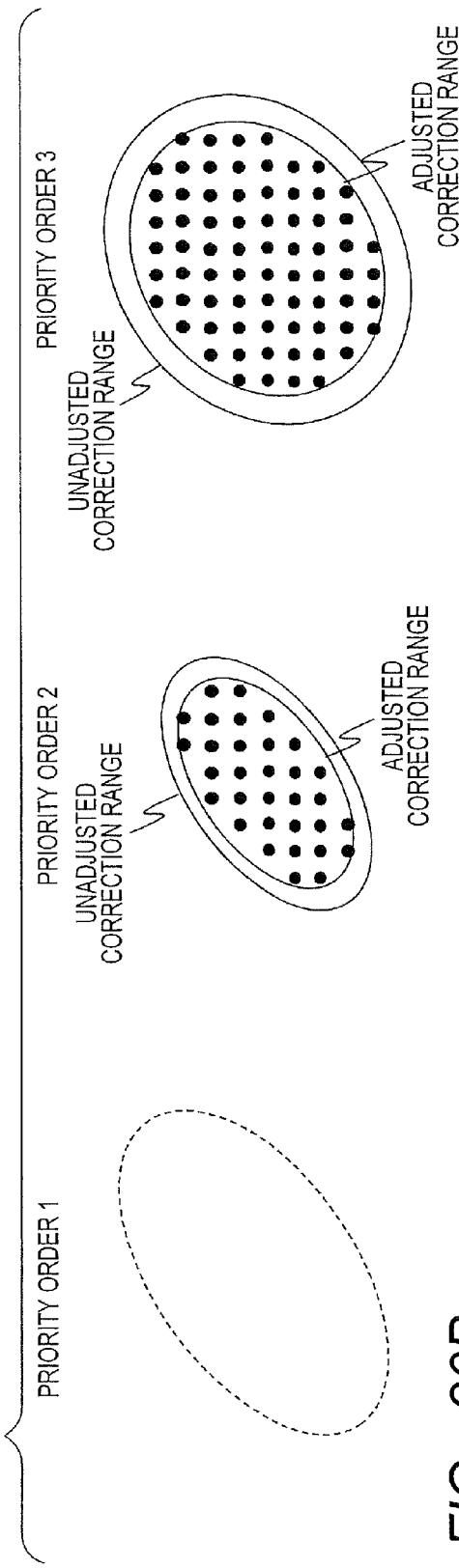
FIGS. 20A and 20B are conceptual diagrams illustrating the operation image of the image processing apparatus according to the fourth embodiment of the present invention.

The operation concept will be described with reference to FIGS. 20A and 20B. In an example of FIGS. 20A and 20B, three memory color correction targets are set. In FIG. 20A, the memory color correction target of the priority order 1 does not exist within the frame. For that reason, the correction range calculation unit 110 adjusts the correction ranges without remarkably reducing the correction range of the memory color correction target of the priority order 2 and the correction range of the memory color correction target of the priority order 3.

Figure 20B:
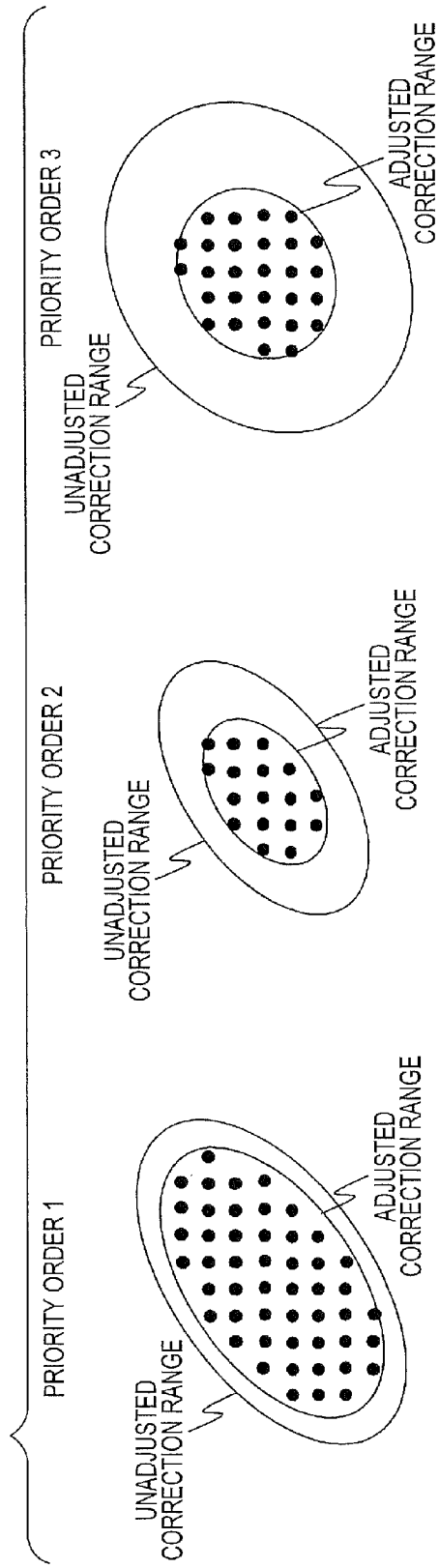

On the other hand, in FIG. 20B, the memory color correction target of the priority order 1 exists within the frame. For that reason, the correction range calculation unit 110 remarkably reduces the correction range of the memory color correction target of the priority order 2 and the correction range of the memory color correction target of the priority order 3. On the other hand, the correction range calculation unit 110 minimizes a reduction in the correction range of the memory color correction target of the priority order 1.

A specific numerical value of the reduction ratio corresponding to the priority order can be appropriately designated by the user.

Thus, taking both of the priority order and the table data limit number into account, the image processing apparatus 1 can sufficiently ensure the correction intensity of the memory color correction target to be subjected to the memory color correction while suppressing the table data to a desired number.

Fifth Embodiment

An image processing apparatus according to this embodiment is characterized in that a plurality of three-dimensional lookup tables can be held. The image processing apparatus according to this embodiment is a modification of the image processing apparatus according to the second embodiment, and therefore differences from the image processing apparatus according to the second embodiment will be mainly described.

Figure 21:
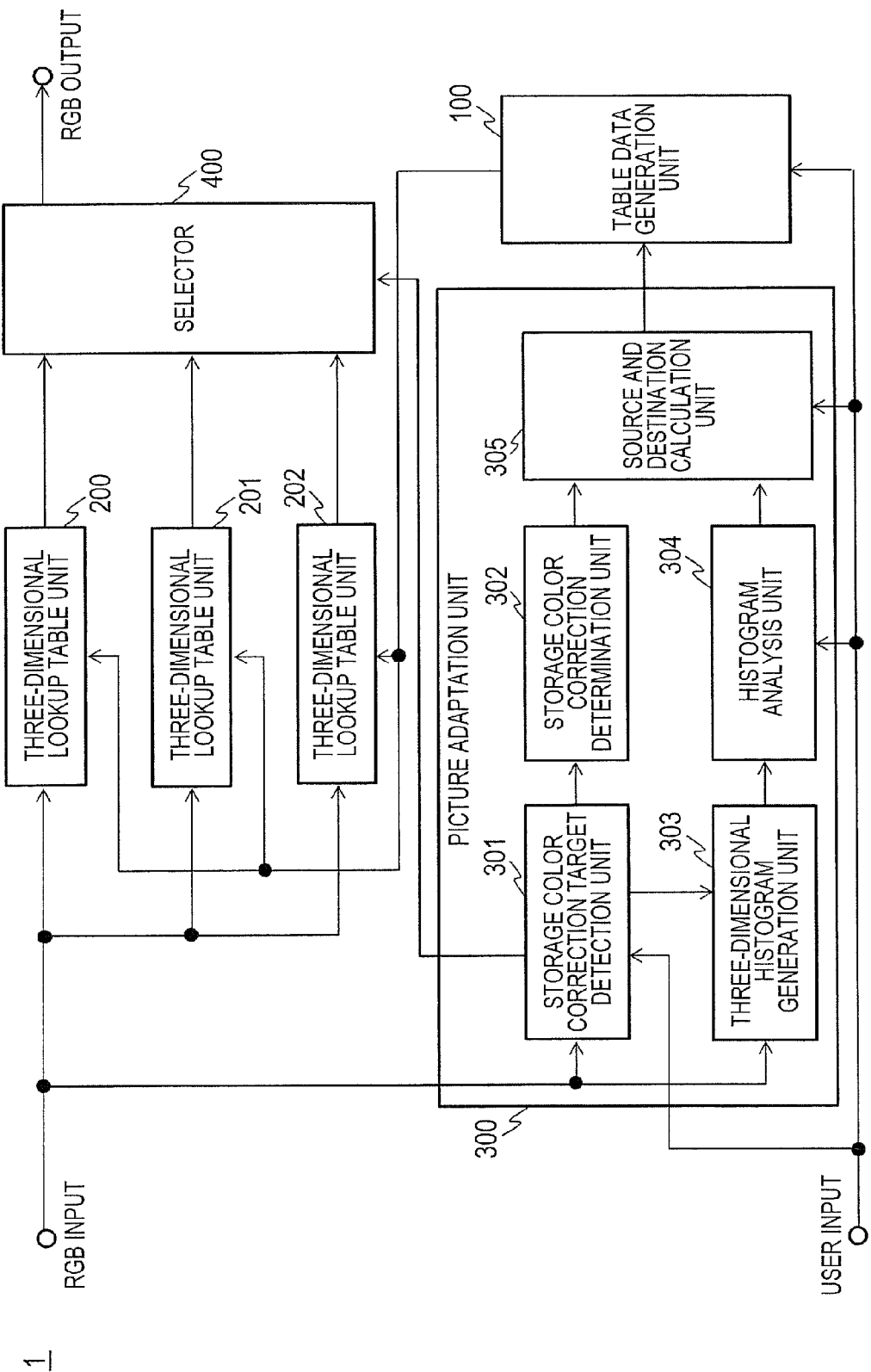
FIG. 21 is a block diagram illustrating a configuration of an image processing apparatus according to a fifth embodiment of the present invention.

FIG. 21 is a block diagram illustrating a configuration of the image processing apparatus 1 according to this embodiment. The image processing apparatus 1 includes a plurality of three-dimensional lookup table units 200 to 202, and a selector 400 in addition to the configuration of FIG. 1.

The storage color correction target detection unit 301 detects the memory color correction target, and also detects in which area each of the memory color correction targets exists within the image, that is, the display area of each memory color correction target within the image. The processing of the storage color correction target detection unit 301 will be described with reference to FIG. 22.

Figure 22:
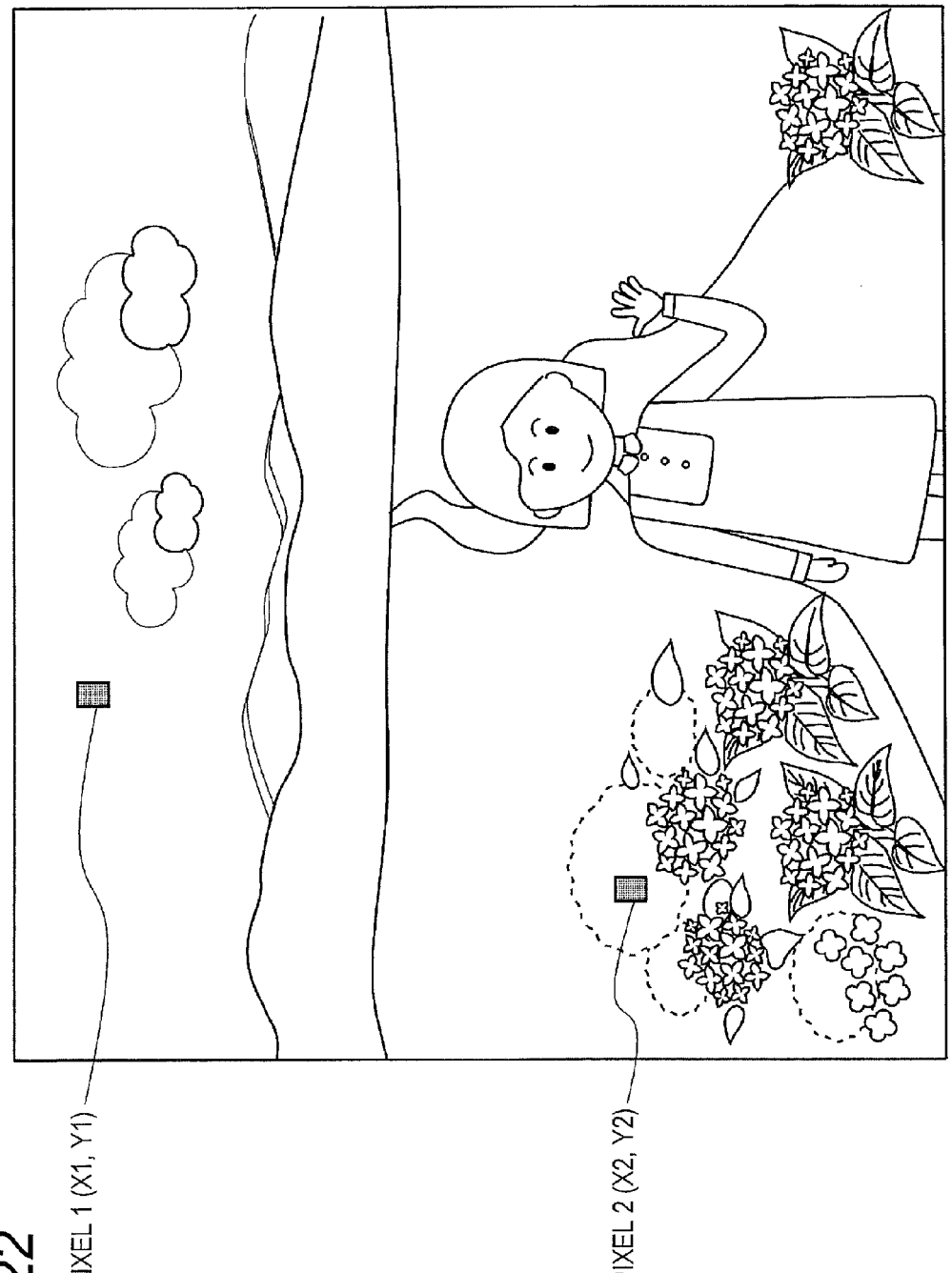
FIG. 22 is a diagram illustrating an image example to be processed by the image processing apparatus according to the fifth embodiment.

In the following example, the storage color correction target detection unit 301 detects three of "blue sky", "blue flower", and "person's skin" as the memory color correction targets. Also, the user sets "blue sky" and "blue flower" as the memory color correction targets. FIG. 22 is a diagram illustrating an example of an image to be corrected. As illustrated in the figure, blue sky exists on an upper portion of the image, and blue flowers exist on a lower left portion of the screen. The user sets source coordinates (RGB value) and destination coordinates (RGB value) in the color space for "blue sky" and "blue flowers". The storage color correction target detection unit 301 notifies the selector 400 which memory color correction target exists in each pixel within the image. For example, the storage color correction target detection unit 301 notifies the selector 400 that the blue sky exists on a pixel 1 (X1, Y1) of FIG. 22. Likewise, the storage color correction target detection unit 301 notifies the selector 400 that the blue flowers exist on a pixel 2 (X2, Y2) of FIG. 22. If the memory color correction target does not exist on a pixel to be processed, the storage color correction target detection unit 301 notifies the selector 400 of this fact.

Figure 23:
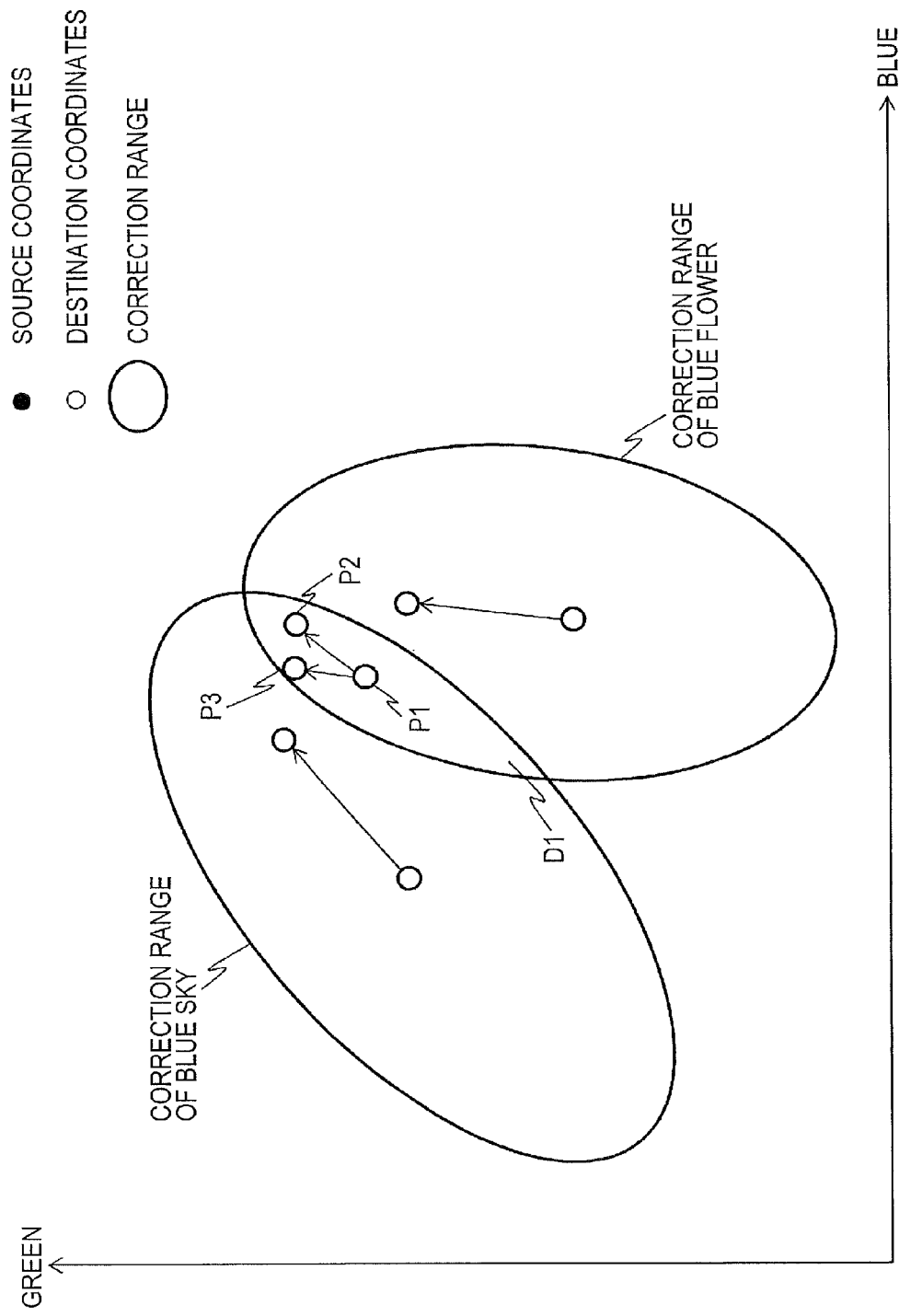
FIG. 23 is a diagram illustrating a correction range of blue sky and a correction range of a blue flower in a GB cross-section.

The correction range calculation unit 110 calculates the correction ranges of the respective memory color correction targets in the same manner as that in the first embodiment. FIG. 23 is a diagram illustrating the correction range of the blue sky and the correction range of the blue flowers. In this example, there exists an overlap range D1 of the correction range of the blue sky and the correction range of the blue flower.

The lattice point transfer distance calculation unit 120 calculates the transfer distance of each lattice point for each of the input memory color correction targets. In an example of FIG. 23, the lattice point transfer distance calculation unit 120 calculates the destination coordinates of each lattice point included within the correction range of the blue sky, and also calculates the destination coordinates of each lattice point included within the correction range of the blue flowers. For that reason, the lattice point transfer distance calculation unit 120 calculates P2 as transformed coordinates when the coordinates P1 is dealt with as the lattice point included within the correction range of the blue sky. The lattice point transfer distance calculation unit 120 calculates P3 as the transformed coordinates when the coordinates P1 is dealt with as the lattice point included within the correction range of the blue flowers.

The lattice point transfer distance calculation unit 120 calculates the transformed coordinates of each lattice point for each of the memory color correction targets. Then, the lattice point transfer distance calculation unit 120 sets the three-dimensional lookup table for each of the memory color correction targets. In the following example, the lattice point transfer distance calculation unit 120 sets the table data related to the memory color correction of the blue sky in the three-dimensional lookup table unit 200, sets the table data related to the memory color correction of the blue flower in the three-dimensional lookup table unit 201, and sets the table data for the other color correction in the three-dimensional lookup table unit 202.

The respective lookup table units (200 to 202) correct the respective pixels in the color space according to the set lookup tables. The respective lookup table units (200 to 202) output the RGB values of the respective pixels obtained by correction to the selector 400.

As described above, the selector 400 is notified of the existence coordinates of the respective memory color correction targets from the storage color correction target detection unit 301. The selector 400 selects and outputs one of the RGB values output from the lookup table units (200 to 202) according to a relationship between the pixel position and the existence coordinates of the respective memory color correction targets. For example, when the pixel 1 is corrected in FIG. 22, the selector 400 selects and outputs the output from the lookup table unit 200 (processing unit in which the table data of the memory color correction of the blue sky is set). Likewise, when the pixel 2 is corrected in FIG. 22, the selector 400 selects and outputs the output from the lookup table unit 201 (processing unit in which the table data of the memory color correction of the blue flowers is set).

Subsequently, a description will be given of the advantages of the image processing apparatus according to this embodiment. As described above, the image processing apparatus 1 according to this embodiment provides the lookup table for each of the memory color correction targets. The image processing apparatus 1 selects an appropriate value from the transformation results of the plurality of lookup tables according to the existence positions of the respective memory color correction targets within the image. As a result, as illustrated in FIG. 23, even if the correction ranges overlap with each other in the color space, the image processing apparatus 1 can appropriately conduct the memory color correction without being affected by the overlap of the correction ranges.

In the above description, the image processing apparatus 1 includes the lookup table for each of the memory color correction targets. However, the present invention is not limited to this configuration. The image processing apparatus 1 may store the table data in another lookup table only when the correction ranges overlap with each other. For example, it is assumed that the correction range of the blue sky and the correction range of the blue flowers overlap with each other, but the correction range of the blue sky and the correction range of the cherry blossoms do not overlap with each other. In this case, the table data related to the correction range of the cherry blossoms is stored in a first lookup table in addition to the table data related to the correction range of the blue sky. Then, the table data related to the correction range of the blue flowers is stored in a second lookup table. This makes it possible to realize the memory color correction processing that is not affected by the overlap of the correction ranges while minimizing an increase in the number of lookup tables.

Sixth Embodiment

An image processing apparatus according to this embodiment is characterized in that an image signal other than the RGB can be dealt with. In the image processing apparatus according to this embodiment, the user can set source coordinates of the memory color correction target and a transfer distance from that coordinates. In the image processing apparatus according to this embodiment, differences from the first embodiment will be mainly described.

Figure 24:
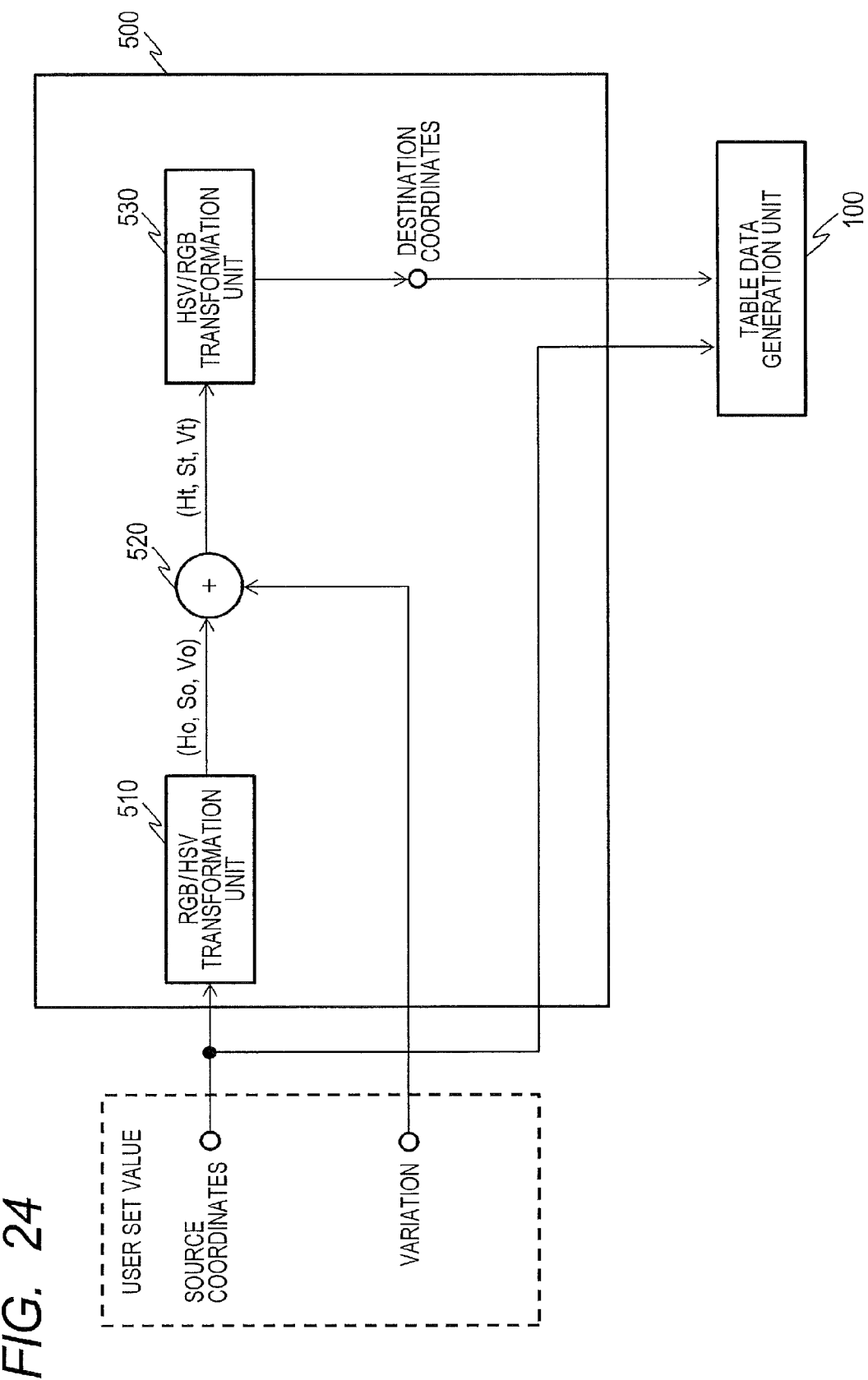
FIG. 24 is a block diagram illustrating a configuration of a color space transformation unit according to a sixth embodiment of the present invention.

The image processing apparatus 1 according to this embodiment is characterized in that a color space transformation unit 500 is provided upstream of the table data generation unit 100 (or the picture adaptation unit 300). FIG. 24 is a block diagram illustrating a configuration of the color space transformation unit 500. The color space transformation unit 500 includes an RGB/HSV transformation unit 510, an adder 520, and an HSV/RGB transformation unit 530.

The user designates source coordinates O(Ro, Go, Bo) and a variation from the source coordinates. In this example, the variation is designated in each item of, for example, hue (H), saturation (S), and brightness (V).

The RGB/HSV transformation unit 510 transforms the source coordinates designated by the user from an RGB values to an HSV value. This transformation may be conducted by a known technique. The RGB/HSV transformation unit 510 outputs the transformed HSV value (Ho, So, Vo) to the adder 520.

The adder 520 adds the variation ($\Delta$H, $\Delta$S, $\Delta$H) in the respective items of hue (H), saturation (S), and brightness (V) to the input HSV value (Ho, So, Vo). The adder 520 outputs an added value (Ht, St, Vt) to the HSV/RGB transformation unit 530.

The HSV/RGB transformation unit 530 transforms the HSV value (Ht, St, Vt) which is the input added value to the RGB value. The RGB value represents destination coordinates T(Rt, Gt, Bt). The HSV/RGB transformation unit 530 supplies the destination coordinates T to the table data generation unit 100. To the table data generation unit 100 is also supplied source coordinates of the RGB format designated by the user.

Through the above processing, the source coordinates O and the destination coordinates T are set in the table data generation unit 100. The subsequent respective processing is identical with that in the first embodiment.

Subsequently, a description will be given of the advantages of the image processing apparatus 1 according to this embodiment. Even when the memory color correction is intended to be conducted, intended color coordinates may not be determined. In this embodiment, the user can designate the variation from the source coordinates instead of the destination coordinates. For that reason, the user conducts ambiguous designations such as "little yellow", "darker color", or "very bright", and can convert the designation to the variation. As a result, a load for setting by the user is further reduced.

In the above-mentioned example, the transformation of the HSV and the RGB is conducted. However, the present invention is not always limited to this configuration. For example, the user inputs the source coordinates and the variation in the RGB format. Then, the adder may calculate the destination coordinates through addition processing.

In the example of FIG. 24, the transformation of the HSV value and the RGB value is described. However, the present invention is not always limited to this configuration, and transformation may be conducted between an HSU value, a YUV value, an HLS value, an Lab value, or an YCM value, and the RGB value.

The image processing apparatus according to the present invention has been described above along the embodiments. However, the present invention is not limited to the above respective embodiments, and can be appropriately changed without departing from the subject matter of the present invention. In the above-mentioned embodiments, the coordinate transformation processing is conducted assuming that the color space is the RGB space. However, the present invention can be applied to other color spaces. That is, the image processing apparatus may conduct the above-mentioned respective processing in the color spaces of the HSV, HSU, YUV, HLS, Lab, and YCM.

The above image processing apparatus 1 is incorporated into, for example, a printer device, a TV receiver, a copying machine, a digital multifunction machine, a projector device, a cellular phone terminal, a digital still camera, a smart phone, a digital photo frame, or a display device in use. That is, the image processing apparatus 1 is used in a device that displays an image in a display unit, a device that can be coupled with a device having the display unit, or a device that prints or displays an image.

All or a part of processing in the respective processing units (the table data generation unit 100, the three-dimensional lookup table unit 200, the picture adaptation unit 300, the selector 400, the color space transformation unit 500) within the image processing apparatus 1 can be configured by hardware using a circuit. Further, all or a part of processing in the respective processing units (the table data generation unit 100, the three-dimensional lookup table unit 200, the picture adaptation unit 300, the selector 400, the color space transformation unit 500) within the image processing apparatus 1 may be realized as a program that operates within an arbitrary computer. The program can be stored in a non-transitory computer readable medium of various types, and supplied to the computer. The non-transitory computer readable medium includes a tangible storage medium of various types. The non-transitory computer readable medium is exemplified by a magnetic recording medium (for example, a flexible disc, a magnetic tape, a hard disc drive), a magneto-optical medium (for example, a magneto-optical disc), a CD-ROM (read only memory), a CD-R, a CD-R/W, and a semiconductor memory (for example, a mask ROM, a PROM (programmable ROM), an EPROM (erasable PROM), a flash ROM, a RAM (random access memory)). Also, the program may be supplied to the computer by a transitory computer readable medium of various types. The transitory computer readable medium is exemplified by an electric signal, an optical signal, and an electromagnetic wave. The transitory computer readable medium can supply the program to the computer through a wired communication path such as an electric wire or an optical fiber, or a wireless communication path.

Figure 25:
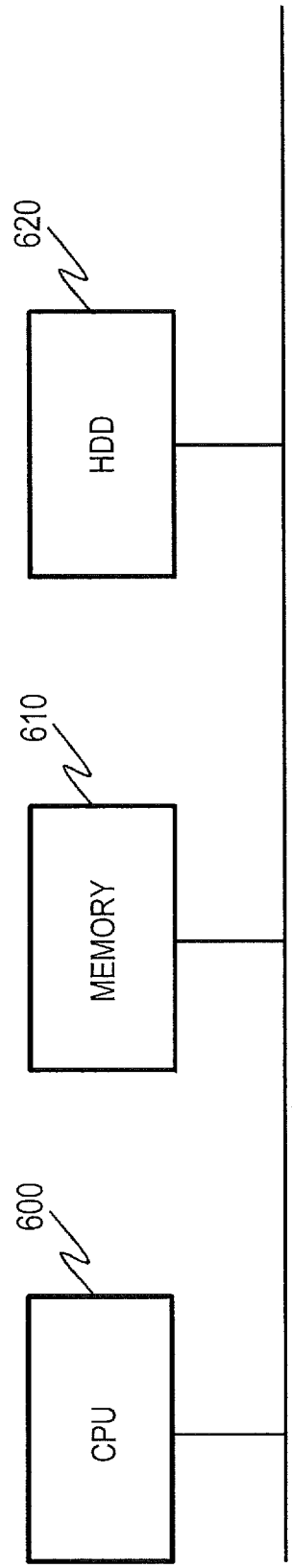
FIG. 25 is a diagram illustrating an example of a hardware configuration which executes processing of the respective processing units in the image processing apparatus as a program.

An example of a hardware configuration of a computer which executes the processing of the respective processing units in the image processing apparatus 1 as the program is illustrated in FIG. 25. The computer includes a central processing unit (CPU) 600 and a memory 610. The CPU 600 and the memory 610 are coupled to a hard disc device (HDD) 620 as an auxiliary storage device through a bus. An instruction is supplied to the CPU 600 in cooperation with an operating system so that a computer program for implementing the respective processing of the above-mentioned image processing apparatus 1 can be stored in a storage medium such as the hard disc device 620.

What is claimed is:

1. An image processing apparatus, comprising:
  a transformation unit that transforms color information on an input image signal on the basis of a transformation rule;
  a correction range calculation unit that calculates a correction range in a predetermined color space on the basis of a positional relationship between source coordinates and destination coordinates in the color space; and a point-based transfer distance calculation unit that calculates transformation destination coordinates at respective points within the correction range on the basis of the positional relationship between the source coordinates and the destination coordinates, and a positional relationship between coordinates at the respective points within the correction range and the source coordinates to reflect the calculated transformation destination coordinates on the transformation rule.

2. The image processing apparatus according to claim 1, wherein the point-based transfer distance calculation unit makes the transfer distance at each point smaller as a distance from the source coordinates is larger.

3. The image processing apparatus according to claim 1, wherein the correction range comprises an oval sphere in which a first line connecting the source coordinates and the destination coordinates is parallel to a long-axis direction.

4. The image processing apparatus according to claim 3, wherein the correction range calculation unit includes:
a first distance calculation unit that calculates a distance between the source coordinates and the destination coordinates;
a line inclination calculation unit that calculates an inclination of the first line;
a correction range adjustment unit that calculates the coordinate range on the basis of a predetermined adjustment value and the distance calculated by the first distance calculation unit;
a rotation angle calculation unit that calculates a rotation angle by which the coordinate range is rotated, on the basis of the inclination of the first line which is calculated by the line inclination calculation unit; and
a correction range oval sphere expression calculation unit that calculates the oval sphere by rotating the coordinate range calculated by the correction range adjustment unit by the rotation angle.

5. The image processing apparatus according to claim 4, wherein the correction range calculation unit calculates an inclination $\Delta 1$ of a first cross-section and an inclination $\Delta 2$ of a second cross-section of the first line in the color space by the following expressions (Ex. 36) and (Ex. 37) when it is assumed that the source coordinates are O(Ro, Go, Bo), and the destination coordinates are T(Rt, Gt, Bt) in the color space $$\Delta 1 = \frac{Gt - Go}{Rt - Ro} \quad \text{(Ex. 36)}$$

$$\Delta 2 = \frac{Bt - Bo}{Gt - Go}. \quad \text{(Ex. 37)}$$

6. The image processing apparatus according to claim 5, wherein the rotation angle calculation unit calculates the rotation angle $\theta 1$ on the first cross-section and the rotation angle $\theta 2$ on the second cross-section in the color space by the following expressions (Ex. 38) and (Ex. 39)

$$\theta 1 = \frac{\text{atan}(\Delta 1) \times 180}{\pi}(°), \quad \text{(Ex. 38)}$$

$Rt - Ro = 0$ at $90(°)$
where $\theta 1$ is $90(°)$ if $Rt - Ro = 0$ $$\theta 2 = \frac{\text{atan}(\Delta 2) \times 180}{\pi}(°), \quad \text{(Ex. 39)}$$

$Gt - Go = 0$ at $0(°)$
where $\theta 2$ is $0(°)$ if $Gt - Go = 0$.

7. The image processing apparatus according to claim 3, wherein the point-based transfer distance calculation unit includes:
a linear expression calculation unit that calculates a linear expression of a second line connecting a first coordinate point included in the correction range and the source coordinates;
an intersection point calculation unit that calculates an intersection point between the oval sphere and the second line on the basis of a mathematical expression of the oval sphere and the linear expression of the second line;
a second distance calculation unit that calculates a distance between the source coordinates and the intersection point;
a third distance calculation unit that calculates a distance between the first coordinate point and the source coordinates;
an influence degree calculation unit that calculates the degree of influence which is the basis of the transfer distance of the first coordinate point according to a ratio of the distance calculated by the second distance calculation unit and the distance calculated by the third distance calculation unit; and
a coordinate calculation unit that calculates the transformation destination coordinates of the first coordinate point on the basis of the degree of influence.

8. The image processing apparatus according to claim 7, wherein the coordinate calculation unit calculates the transformation destination coordinates of the first coordinate point according to a correction direction including one of a (compression direction and a parallel direction) designated by the user.

9. The image processing apparatus according to claim 8, wherein the point-based transfer distance calculation unit includes a transfer characteristic adjustment unit that calculates transfer characteristics adjusted to be increased more than a linear change, and sets the transfer characteristics as a parameter when the coordinate calculation unit calculates the transformation destination coordinates of the first coordinate point.

10. The image processing apparatus according to claim 1, wherein the coordinates of each point within the correction range to be processed by the point-based transfer distance calculation unit comprise lattice point coordinates in which all of distances from adjacent points are equal to each other.

11. The image processing apparatus according to claim 1, wherein the source coordinates and the destination coordinates comprise input values designated by the user.

12. The image processing apparatus according to claim 1, further comprising a picture adaptation unit that receives, from the user, a type of a memory color correction target, a first preset value of the source coordinates, and a second preset value of the destination coordinates related to each memory color correction target to be corrected, determines whether the memory color correction target designated by the user exists within an image configured by the image signal, or not, analyzes a color distribution of the image, adjusts at least one of the first preset value and the second preset value for each of the correction targets that exist within the image on the basis of analysis results of the color distribution in the image, and sets adjusted values to the source coordinates and the destination coordinates for each of the memory color correction targets.

13. The image processing apparatus according to claim 12, wherein the picture adaptation unit includes:
a correction target detection unit that detects the presence or absence of an object or a background to be subjected to the memory color correction within the image, and a detection area of the memory color correction target within the image;
a memory color correction determination unit that compares a detection result of the correction target detection unit with the type of the memory color correction target designated by the user to determine the memory color correction target to be conducted;
a histogram generation unit that generates a color space histogram of the image;
a histogram analysis unit that calculates a first analysis result related to a color distribution analysis within the detection area, and a second analysis result related to a color distribution analysis between the color space coordinates indicated by the first preset value and the second preset value, on the basis of the color space histogram; and
a source and destination calculation unit that calculates the source coordinates and the destination coordinates for each of the memory color correction targets which exist within the image, on the basis of the memory color correction target determined by the memory color correction determination unit, the first and second analysis results, and the first and second preset values.

14. The image processing apparatus according to claim 13, wherein the histogram analysis unit sets main color coordinates indicative of a main color in the detection area as the first analysis result, divides an area between the color space coordinates indicated by the first preset value and the second preset value into a plurality of areas, determines whether a given number of pixels or more exist in the respective areas, or not, in order from an area closer to the first preset value, and sets the existence coordinates which are representative coordinates of the areas in which the given number of pixels or more exist as the second analysis result.

15. The image processing apparatus according to claim 14, wherein the source and destination calculation unit calculates the source coordinates and the destination coordinates by the following expressions (Ex. 40) and (Ex. 41) assuming that the main color coordinates are OC(OCr, OCg, OCb), the existence coordinates are TE(TEr, TEg, TEb), the first preset value is OP(OPr, OPg, ORb), the second preset value is TP(TPr, TPg, TRb), the source coordinates are O(Ro, Go, Bo), the destination coordinates are T(Rt, Gt, Bt), and following degrees adjustable by the user are F1(0~100%) and F2(0~100%)

$Ro=OPr+(OCr-OPr)\times F1$ $Go=OPg+(OCg-OPg)\times F1$ $Bo=OPb+(OCb-OPb)\times F1$ (Ex. 40)

$Rt=TPr+(TEr-TPr)\times F2$ $Gt=TPg+(TEg-TEg)\times F2$ $Rt=TPr+(TEb-TPb)\times F2$ (Ex. 41)

16. The image processing apparatus according to claim 1, wherein the correction range calculation unit receives an input of a rule limit number of the transformation rule from the user, compares the number of respective point coordinates within the correction range which is calculated from a size of the correction range with the rule limit number, and recalculates the correction range so that the area range becomes smaller if the rule limit number is smaller than the number of respective dot coordinates within the correction range.

17. The image processing apparatus according to claim 1, wherein the correction range calculation unit receives an input of a priority order of the memory color correction targets from the user, determines whether the correction ranges of the respective memory color correction targets overlap with each other, and recalculates the correction ranges of the respective memory color correction targets so that a reduction ratio of the correction ranges of the memory color correction targets becomes larger in ascending order of the priority order.

18. The image processing apparatus according to claim 16, wherein the correction range calculation unit recalculates the correction ranges after at least one of the source coordinates and the destination coordinates is so adjusted as to decrease a distance between the source coordinates and the destination coordinates.

19. The image processing apparatus according to claim 13, wherein the transformation unit includes at least a first transformation unit and a second transformation unit,
wherein the picture adaptation unit detects the respective display areas of the first color correction target and the second memory color correction target, which are the memory color correction targets designated by the user, within the image,
wherein the correction range calculation unit calculates the respective correction ranges corresponding to the first and second memory color correction targets, and
wherein the point-based transfer distance calculation unit calculates the transformation destination coordinates of the respective points within the correction range of the first memory color correction target to reflect the calculated transformation destination coordinates on the transformation rule of the first transformation unit, and calculates the transformation destination coordinates of the respective points within the correction range of the second memory color correction target to reflect the calculated transformation destination coordinates on the transformation rule of the second transformation unit.

20. The image processing apparatus according to claim 1, wherein the color space comprises any one of RGB, HSV, HSU, YUV, HLS, Lab, and YCM.

21. The image processing apparatus according to claim 1, wherein the transformation rule comprises an LUT (lookup table).

22. An image processing method of transforming color information on an input image signal on the basis of a transformation rule, comprising:
calculating a correction range in a predetermined color space on the basis of a positional relationship between source coordinates and destination coordinates in the color space; and
calculating transformation destination coordinates at respective points within the correction range on the basis of the positional relationship between the source coordinates and the destination coordinates, and a positional relationship between coordinates at the respective points within the correction range and the source coordinates to reflect the calculated transformation destination coordinates on the transformation rule.

23. A non-transitory computer readable recording medium storing a program causing a computer to execute processing comprising:

transforming color information on an input image signal on the basis of a transformation rule;

calculating a correction range in a predetermined color space on the basis of a positional relationship between source coordinates and destination coordinates in the color space; and calculating transformation destination coordinates at respective points within the correction range on the basis of the positional relationship between the source coordinates and the destination coordinates, and a positional relationship between coordinates at the respective points within the correction range and the source coordinates to reflect the calculated transformation destination coordinates on the transformation rule.

* * * * *